United States Patent
Matono

(10) Patent No.: US 6,778,354 B2
(45) Date of Patent: Aug. 17, 2004

(54) MAGNETIC HEAD AND METHOD OF MANUFACTURING THE SAME

(75) Inventor: Naoto Matono, Saku (JP)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 58 days.

(21) Appl. No.: 10/012,882

(22) Filed: Nov. 29, 2001

(65) Prior Publication Data

US 2002/0089783 A1 Jul. 11, 2002

(30) Foreign Application Priority Data

Nov. 29, 2000 (JP) ........................................ 2000-363659

(51) Int. Cl.⁷ ................................................. G11B 5/17
(52) U.S. Cl. ....................................... 360/123; 360/126
(58) Field of Search .............................. 360/123, 125, 360/126, 127

(56) References Cited

U.S. PATENT DOCUMENTS

| | | | | |
|---|---|---|---|---|
| 4,223,360 A | * | 9/1980 | Sansom et al. | 360/123 |
| 4,303,956 A | * | 12/1981 | Kobubu et al. | 360/123 |
| 4,376,337 A | * | 3/1983 | Kobayasi et al. | 29/603.18 |
| 4,698,711 A | * | 10/1987 | Vinal | 360/321 |
| 4,972,287 A | * | 11/1990 | Das | 360/126 |
| 5,022,141 A | * | 6/1991 | Nagata et al. | 29/603.24 |
| 5,195,005 A | * | 3/1993 | Mallary et al. | 360/126 |
| 5,311,386 A | * | 5/1994 | Mallary | 360/126 |
| 5,428,887 A | * | 7/1995 | Mallary | 29/603.08 |
| 5,428,893 A | * | 7/1995 | Mallary | 29/603.07 |
| 5,548,459 A | * | 8/1996 | Egawa et al. | 360/234.8 |
| 6,459,543 B1 | * | 10/2002 | Sasaki | 360/126 |
| 6,542,331 B1 | * | 4/2003 | Chang et al. | 360/126 |

FOREIGN PATENT DOCUMENTS

| | | | | |
|---|---|---|---|---|
| JP | | 5101337 A | 4/1993 | |
| JP | | 5242429 A | 9/1993 | |
| JP | | 07073413 A | * 3/1995 | G11B/5/31 |

* cited by examiner

Primary Examiner—William Klimowicz
(74) Attorney, Agent, or Firm—Kenyon & Kenyon

(57) ABSTRACT

It is an object of the invention to provide a magnetic head in which coils can be miniaturized while shortening the manufacturing time and improve the yield, and a method of manufacturing the same. A coil is formed in a form of continuum in which a first winding unit wound clockwise around a bottom pole and a second winding unit wound counterclockwise around a top pole are alternatively coupled. If the number of turns of the coil is increased, spaces between each of coil parts become close. However, spaces between each of other coil parts are sufficiently kept apart. The former coil part is required to be formed with high precision while the latter coil parts do not require such precision. Therefore, portion of the thin film coil which requires high precision is reduced.

3 Claims, 27 Drawing Sheets

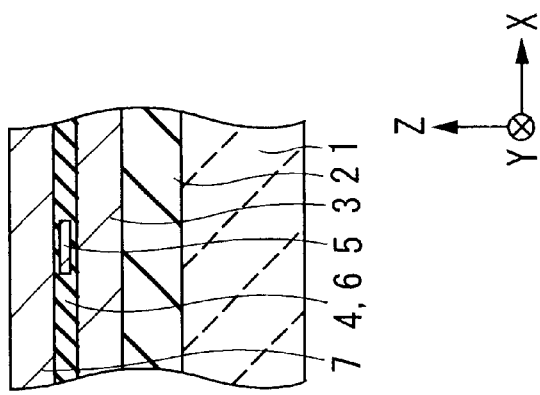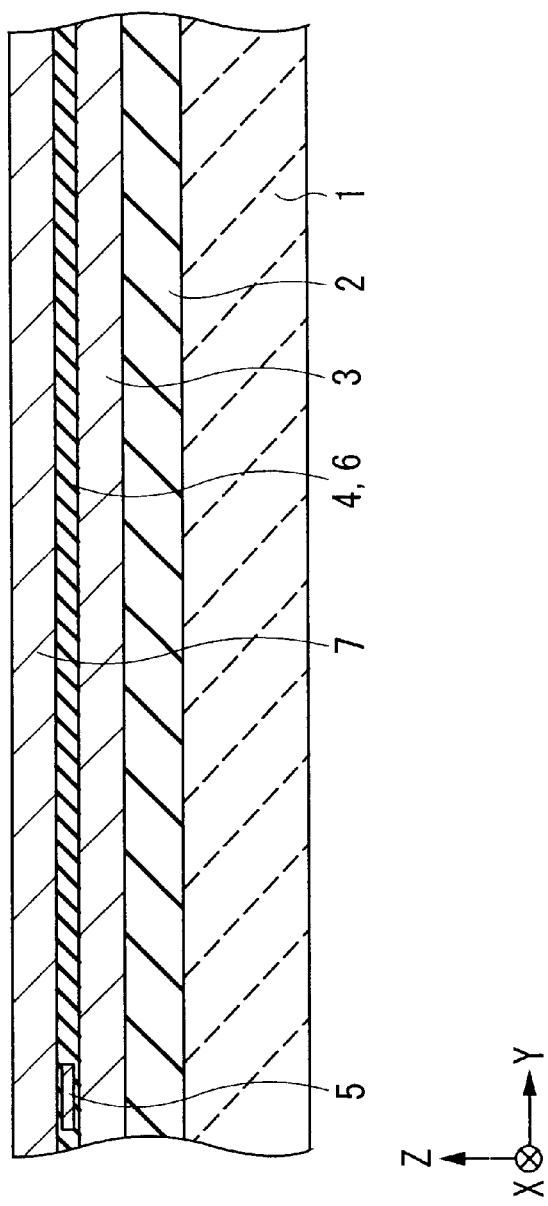
FIG. 1A
FIG. 1B

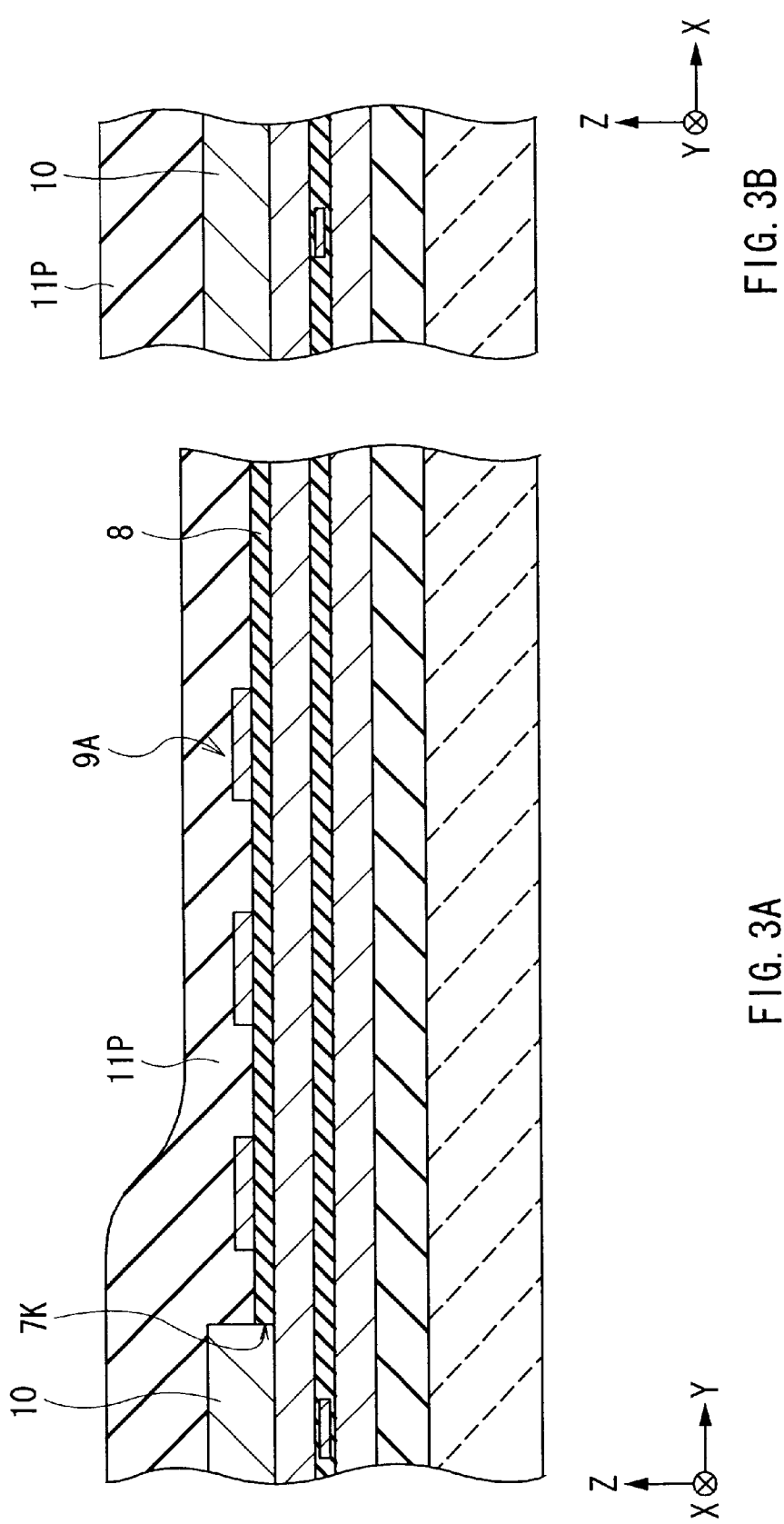

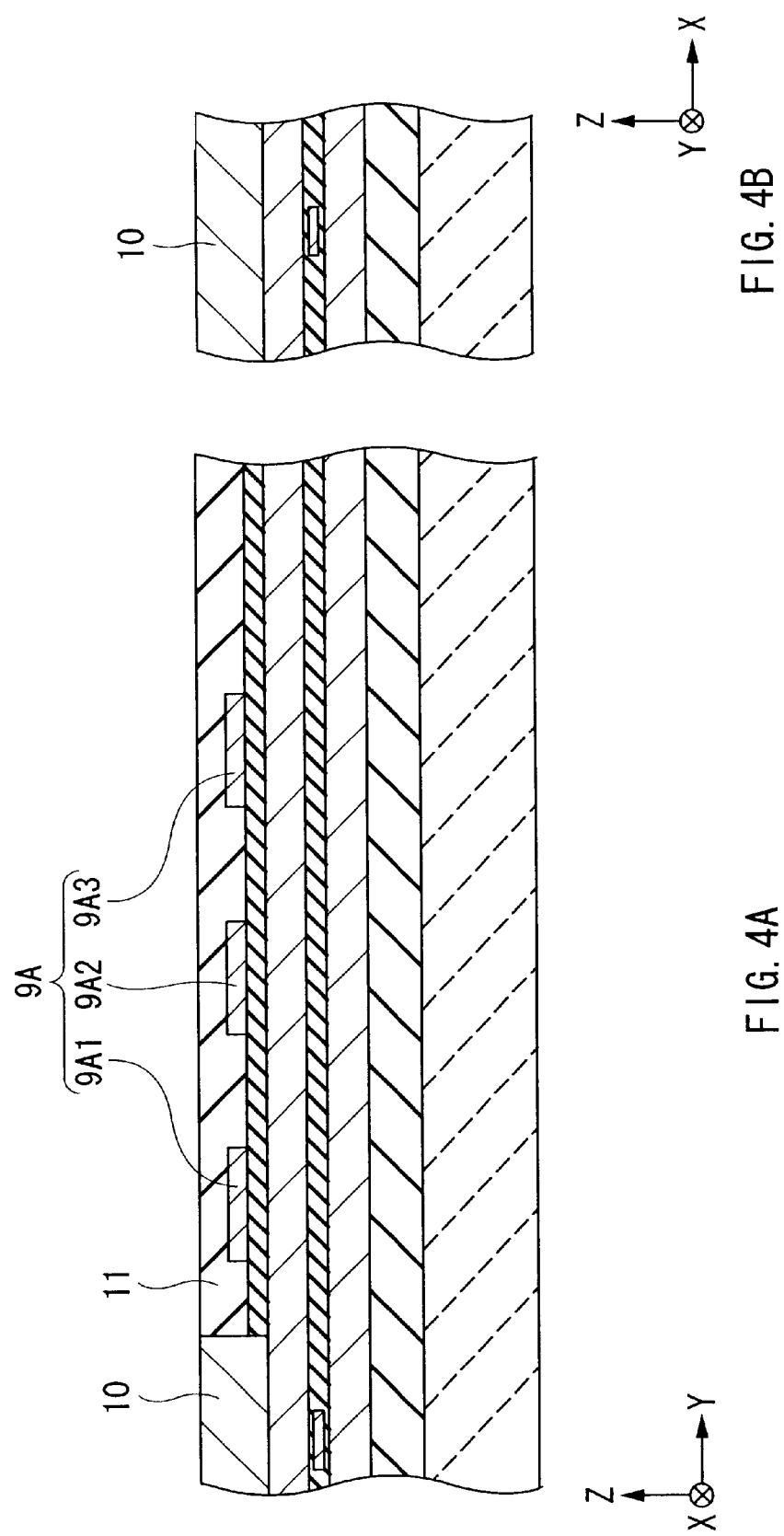

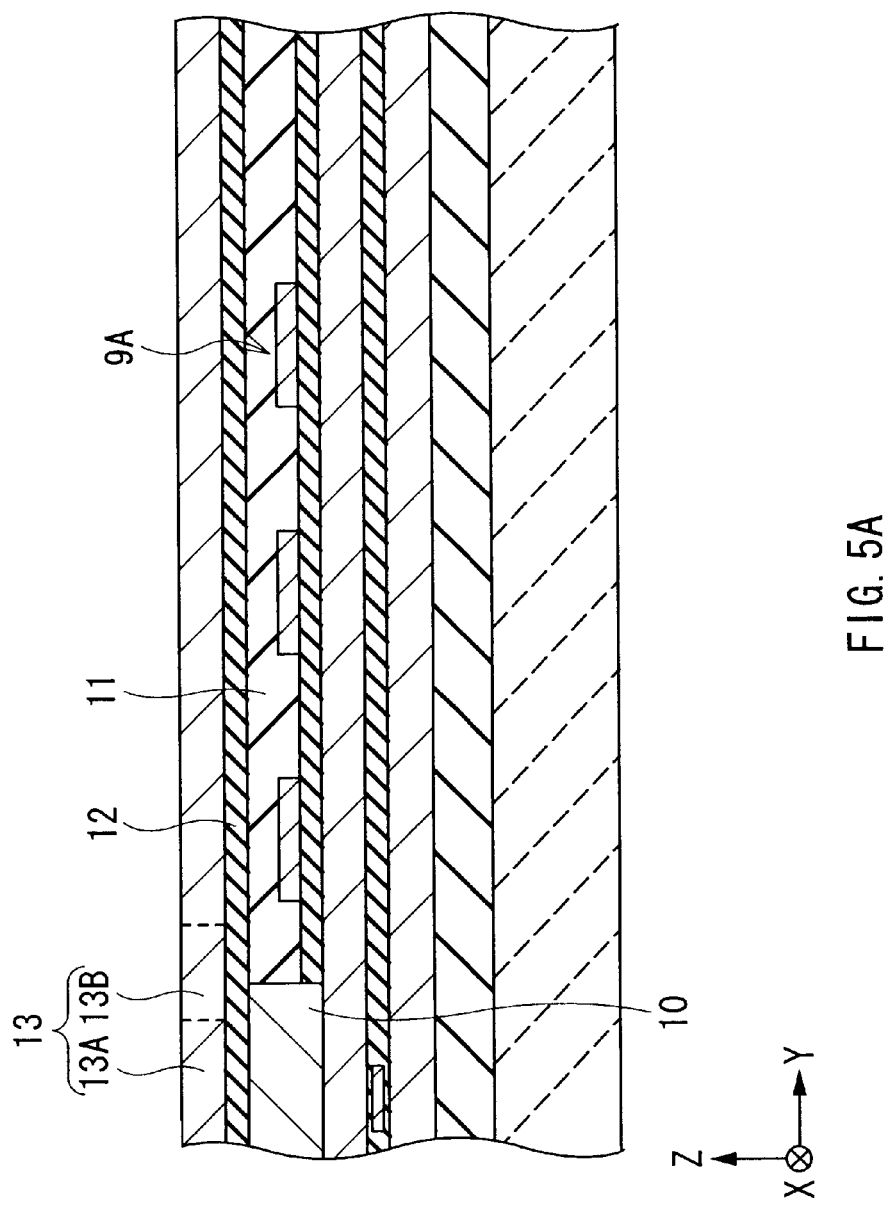

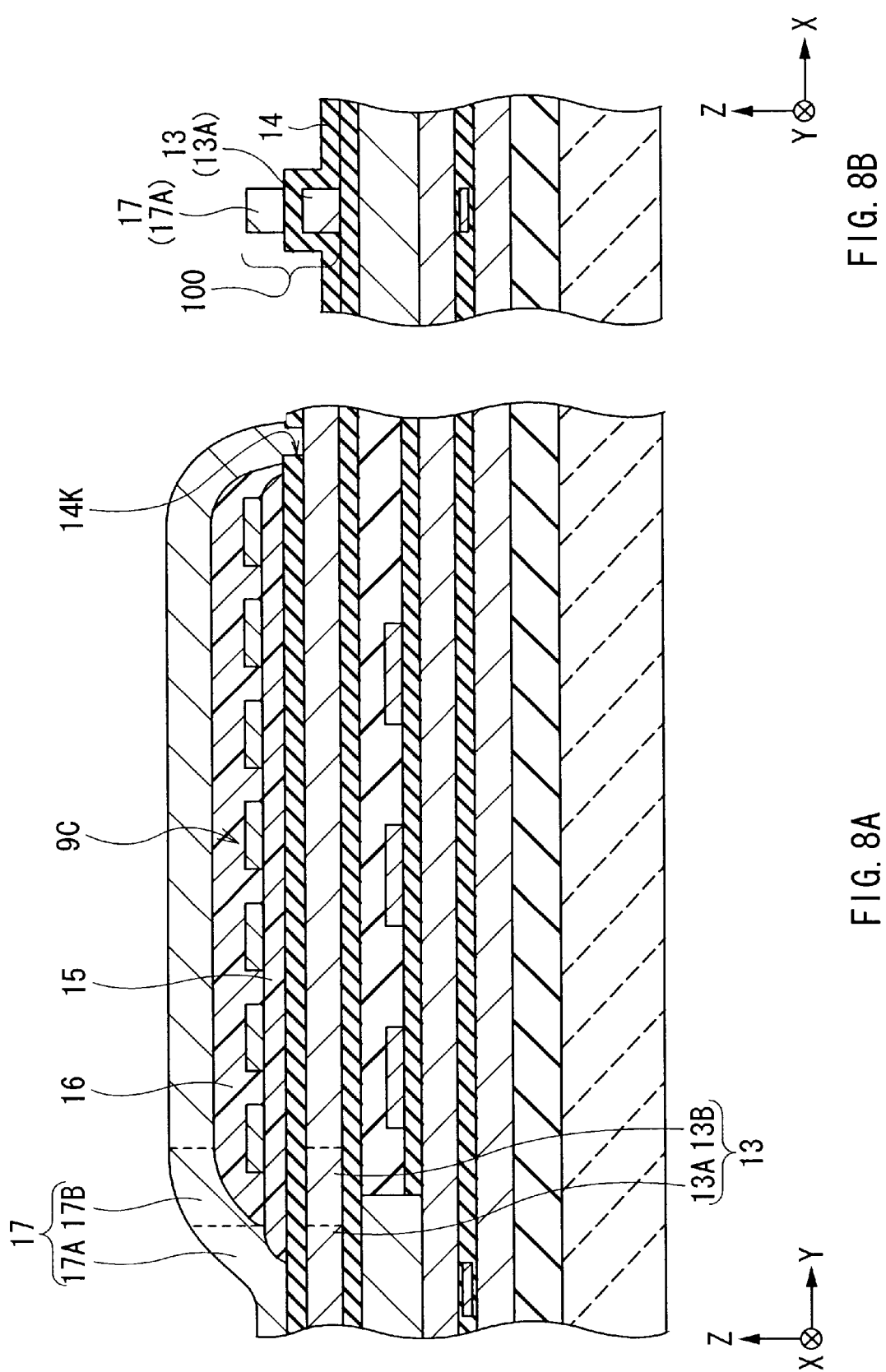

MAGNETIC HEAD AND METHOD OF MANUFACTURING THE SAME

BACKGROUND OF THE INVENTION

1. Field of the Invention

The invention relates to a magnetic head comprising at least an inductive-type magnetic transducer for writing and a method of manufacturing the same.

2. Description of the Related Art

In recent years, performance improvement in thin film magnetic heads has been sought in accordance with an increase in areal density in a hard disk drive. As a thin film magnetic head, a composite thin film magnetic head has been widely used. A composite thin film magnetic head has a configuration in which a recording head with an inductive-type magnetic transducer for writing and a reproducing head with a magnetoresistive device (also referred to as MR device in the followings) for reading-out are stacked.

A recording head is comprised of, for example, a top pole and a bottom pole which are magnetically coupled in one end and are provided sandwiching a write gap in between, and a coil for generating magnetic flux. The top pole and the bottom pole have a uniform width (a uniform width area) identical to each other in a region near the write gap layer closer to a recording-medium-facing surface (air bearing surface) facing a magnetic recording medium (simply referred to as a recording medium in the followings). Thereby, a "magnetic pole portion" for determining the recording track is formed.

For example, "spiral structure" in which a coil is wound around a core two-dimensionally (in a plane), rendering the top pole, the bottom pole or the contact of the top and bottom pole the center, and "helical structure" in which a coil is wound around the top pole and the bottom pole are known as coil structure. As an example to which these coil structures are applied discloses a structure in which Japanese unexamined Patent Application Publication No. Hei 5-242429, a helical conductive coil formed of a bottom stripe conductive film and a top stripe conductive film is wound around the top magnetic core in a thin film magnetic head comprising a top magnetic core and a bottom magnetic core facing each other. Also, Japanese Utility Model No. 3033043 discloses a configuration in which, a thin film magnetic head comprises a first core and a second core facing each other, a plurality of spiral coil layers which is wound around the first core clockwise (or counterclockwise) while being wound around the second core counterclockwise (or clockwise) is provided in a layered structure, while being connected to each other. Furthermore, Japanese unexamined Patent Application Publication No. Hei 5-101337 discloses a configuration in which, in a thin film magnetic head comprising a top thin film magnetic core and a bottom thin film magnetic core facing each other, a helical coil is wound around the bottom thin film magnetic core and a helical coil wound around the top thin film magnetic core are coupled with a spiral coil in between.

In a thin film magnetic head, for example, magnetic flux generates when a current flows through the coil at the time of operation of writing information. The generated magnetic flux is propagated to a uniform width area of the top pole which forms a part of the magnetic pole portion via propagation path (referred to as a magnetic path in the followings) of the magnetic flux, which is formed of the top pole and the bottom pole. The magnetic flux propagated to the uniform width area further reaches the tip of the air bearing surface. The magnetic flux reached the tip of the uniform width area leaks outside near the write gap. Thereby, a signal field for writing generates. The recording medium is partially magnetized by the signal field and information is written.

In recent years, for example, miniaturization of coils are sought in order to miniaturize thin film magnetic heads. In order for coils to be miniaturized, the helical structure in which a small region is occupied by the coil is more appropriate as the coil structure than the spiral structure with a two-dimensional spread. It is thought that the coil structure can be more miniaturized by making spaces between the turns of the coils narrower.

However, a thin film magnetic head of the related art has a problem that, because of the following reasons, long manufacturing time is required, so that yield is decreased. For example, high forming precision is required to make spaces between the turns of coils narrower so that the coils are miniaturized. In such a case, the manufacturing process of coils becomes complicated in order to maintain formation with high precision. Therefore, it requires a long time to manufacture a thin film magnetic head. Also, if the forming precision of the coils is not sufficient or there is a small shift in the forming precision at the time of forming the coils, short circuit or the like occurs because of contact between the turns of the coils. As a result, yield of the thin film magnetic head may be decreased. In short, in the related art, it has been difficult to properly achieve miniaturization of coils and improving yield at the same time.

The above-mentioned problems are not particular ones of a thin film magnetic head. Other types of magnetic heads that have the same structure (two magnetic substances facing each other and a coil for generating magnetic flux) as the thin film magnetic head, have the same problems, too.

SUMMARY OF THE INVENTION

The invention has been designed to overcome the foregoing problems. An object of the invention is to provide a thin film magnetic head in which the manufacturing time can be shortened and yield can be improved while miniaturizing coils, and a method of manufacturing the same.

A magnetic head of the invention comprises: two magnetic substances magnetically coupled to each other, which are extendedly formed in a direction away from a recording-medium-facing surface facing a recording medium, including two magnetic poles facing each other with a gap in between facing the recording medium; and a coil extendedly formed along in the extended direction of the two magnetic substances including a first winding unit wound around one of the two magnetic substances in a predetermined direction and a second winding unit wound around the other magnetic substances of the two magnetic substances in the opposite direction of the predetermined direction; and an insulator which isolates the coil from the two magnetic substances. In the magnetic head, the coil is in a form of continuum in which the first winding unit and the second winding unit are alternatively coupled.

In the magnetic head of the invention, the coil is in a form of continuum in which the first winding unit and the second winding unit are alternatively coupled. Thereby, portion of the coil which requires high forming precision decreases.

In a magnetic head of the invention, at least the gap, the two magnetic substances, the coil and the insulator may be formed of a thin film.

A method of manufacturing a magnetic head of the invention comprises: two magnetic layers magnetically coupled to each other, which are extendedly formed in a direction away from a recording-medium-facing surface facing a recording medium, including two magnetic poles facing each other with a gap layer in between facing the recording medium; and a thin film coil extendedly formed along the extended direction of the two magnetic layers including a first winding unit wound around one of the two magnetic layers in a predetermined direction and a second winding unit wound around the other magnetic layer of the two magnetic layers in the opposite direction of the predetermined direction; and an insulator which isolates the coil from the two magnetic layers. In the method, a plurality of elements composing the thin film coil is stacked in order so that the thin film coil is formed to be in a form of continuum in which the first winding unit and the second winding unit are alternatively coupled.

In a method of manufacturing a magnetic head of the invention, a plurality of elements composing the thin film coil is stacked in order so that the thin film coil is formed to be in a form of continuum in which the first winding unit and the second winding unit are alternatively coupled.

Other and further objects, features and advantages of the invention will appear more fully from the following description.

BRIEF DESCRIPTION OF THE DRAWINGS

FIG. 1A and FIG. 1B are cross sections for describing a step in a method of manufacturing a thin film magnetic head according to an embodiment of the invention.

FIG. 3A and FIG. 3B are cross sections for describing a step following the step shown in FIG. 2A and FIG. 2B.

FIG. 4A and FIG. 4B are cross sections for describing a step following the step shown in FIG. 3A and FIG. 3B.

FIG. 5A and FIG. 5B are cross sections for describing a step following the step shown in FIG. 4A and FIG. 4B.

FIG. 8A and FIG. 8B are cross sections for describing a step following the step shown in FIG. 7A and FIG. 7B.

DETAILED DESCRIPTION OF THE PREFERRED EMBODIMENTS

In the followings, an embodiment of the invention will be described in detail by referring to the figures.

Referring to FIGS. 1A and 1B to FIG. 22, a method of manufacturing a composite thin film magnetic head will be described as a method of manufacturing a thin film magnetic head according to an embodiment of the invention. A thin film magnetic head according to the embodiment will be embodied in a method of manufacturing a thin film magnetic head according to the embodiment, so that both will be described together in the followings.

Figure 21:
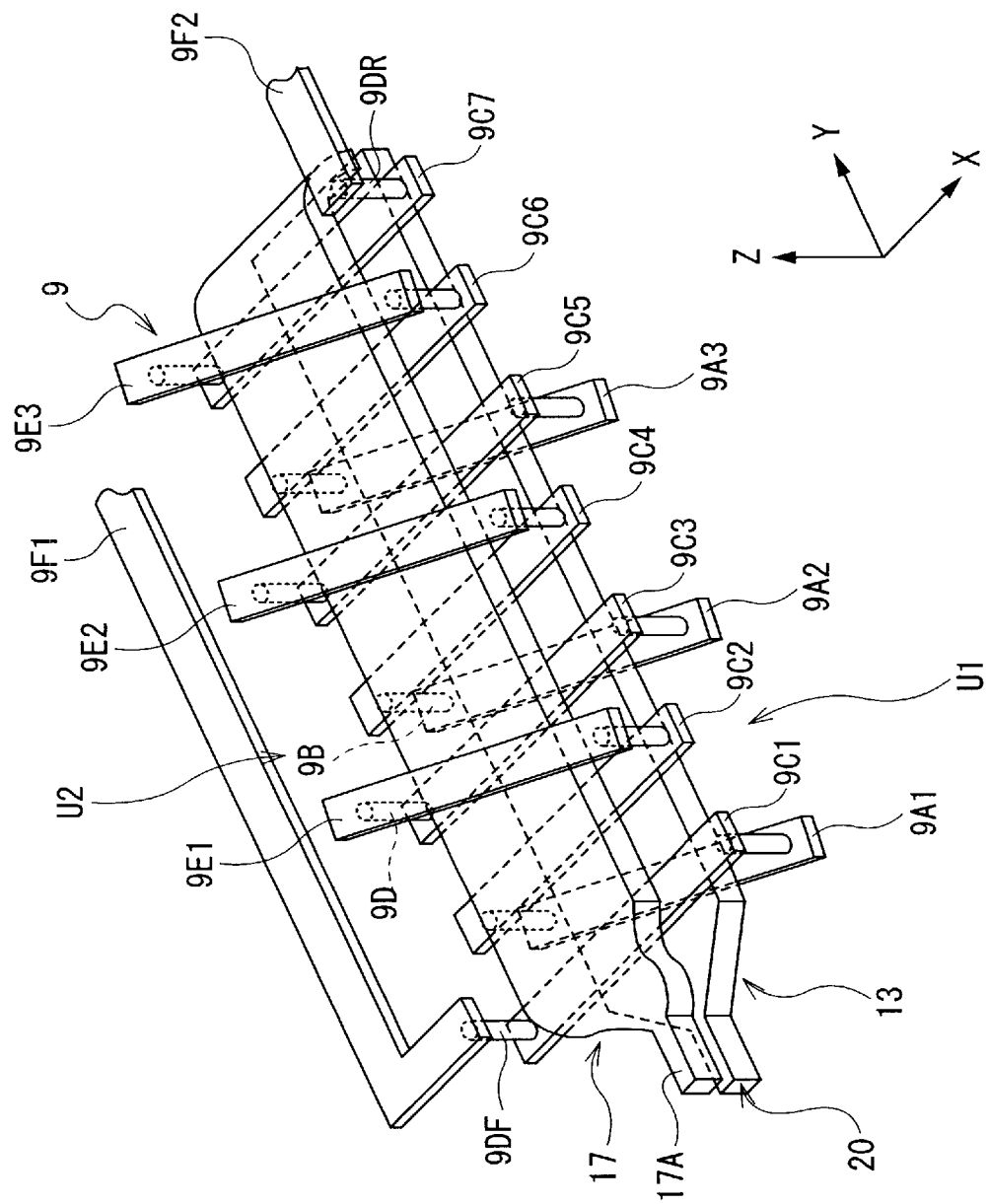
FIG. 21 is a perspective view showing the complete state of a thin film coil, a top pole and a bottom pole.
Figure 22:
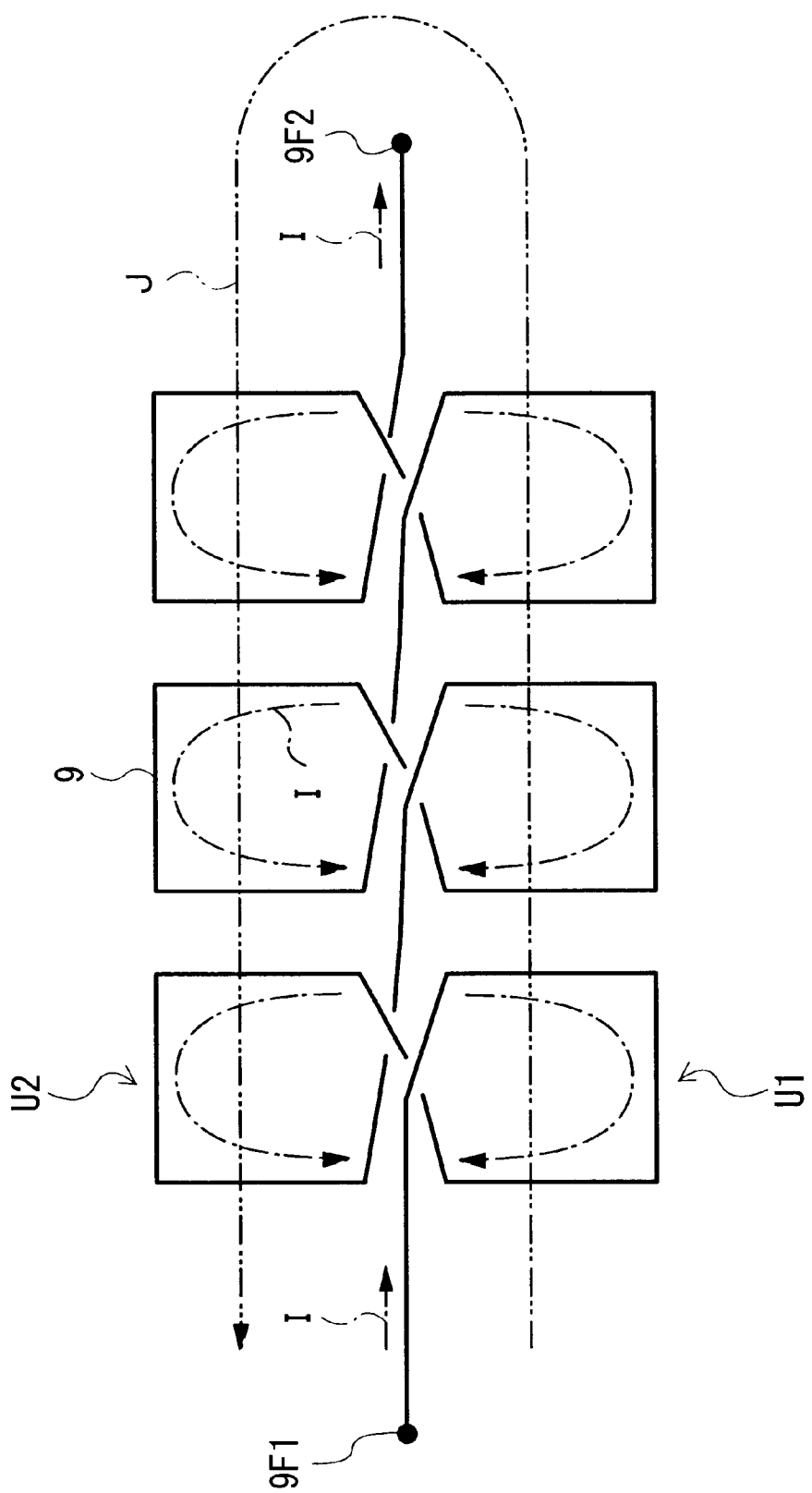
FIG. 22 is a figure illustrating a simplified configuration of a thin film coil.

FIG. 1A to FIG. 12A show a cross sectional configuration vertical to the air bearing surface and FIG. 1B to FIG. 12B show a cross sectional configuration parallel to the air bearing surface. FIG. 13 to FIG. 20 show the perspective configuration of the main manufacturing step and FIG. 21 shows the perspective configuration in the completed state of a thin film coil 9, a bottom pole 13 and a top pole 17. FIG. 22 shows the configuration of a thin film coil 9 in the completed state being simplified in one line. In FIG. 13 to FIG. 20, FIG. 13 corresponds to the state shown in FIGS. 2A and 2B, FIG. 14 to 4A and 4B, FIG. 15 to FIGS. 5A and 5B, FIG. 16 to FIGS. 6A and 6B, FIG. 17 to FIGS. 7A and 7B, FIG. 18 to FIGS. 8A and 8B, FIG. 19 to FIGS. 9A and 9B, FIG. 20 to FIGS. 10A and 10B, respectively. The above-mentioned FIG. 2A to FIG. 10A correspond to the perspective views taken along the line A—A in FIG. 13 to FIG. 20.

In the following description, the direction of X-axis in each figure of FIGS. 1A and 1B to FIG. 22 is referred to as "width or width direction", and the direction of Y-axis is referred to as "length or length direction", and the direction of Z-axis is referred to as "thickness or thickness direction". Also, in the direction of Y-axis, the side close to air bearing surface 20 (or will-be the side close to air bearing surface 20 in the later process) is referred to as "front side or front" and the opposite side is referred to as "rear side or rear".

<Method of Manufacturing a Thin Film Magnetic Head>

In a manufacturing method according to the embodiment, first, as shown in FIGS. 1A and 1B, an insulating layer 2 about 3.0 $\mu$m to 5.0 $\mu$m thick made of, for example, aluminum oxide ($Al_2O_3$; simply referred to as alumina in the followings) is deposited on a substrate 1 made of, for example, altic ($Al_2O_3$ TiC). Then, a bottom shield layer 3 about 2.0 μm thick made of, for example, nickel ferrous alloy (NiFe; simply referred to as permalloy (a trade name)) is selectively formed on the insulating layer 2 by, for example, frame plating which will be described later.

Next, as shown in FIGS. 1A and 1B, a shield gap film 4 about 0.01 μm to 0.1 μm thick made of, for example, alumina, is formed on the bottom shield layer 3 by, for example, sputtering. Then, an MR film 5 for forming an MR device is formed on the shield gap film 4 and is processed to a desired shape by photolithography with high precision. Next, a lead layer (not shown) as a lead electrode layer, which is electrically connected to the MR film 5, is selectively formed by photolithography with high precision. Then, a shield gap film 6 is formed in the same manner as the case of forming the shield gap film 4 so as to cover the MR film 5. Thereby, the MR film 5 or the like are buried in the shield gap films 4 and 6.

Next, A top shield layer 7 about 1.0 μm to 2.0 μm thick made of, for example, permalloy is selectively formed on the shield gap films 4 and 6 by, for example, frame plating.

Figures 2A, 2B:
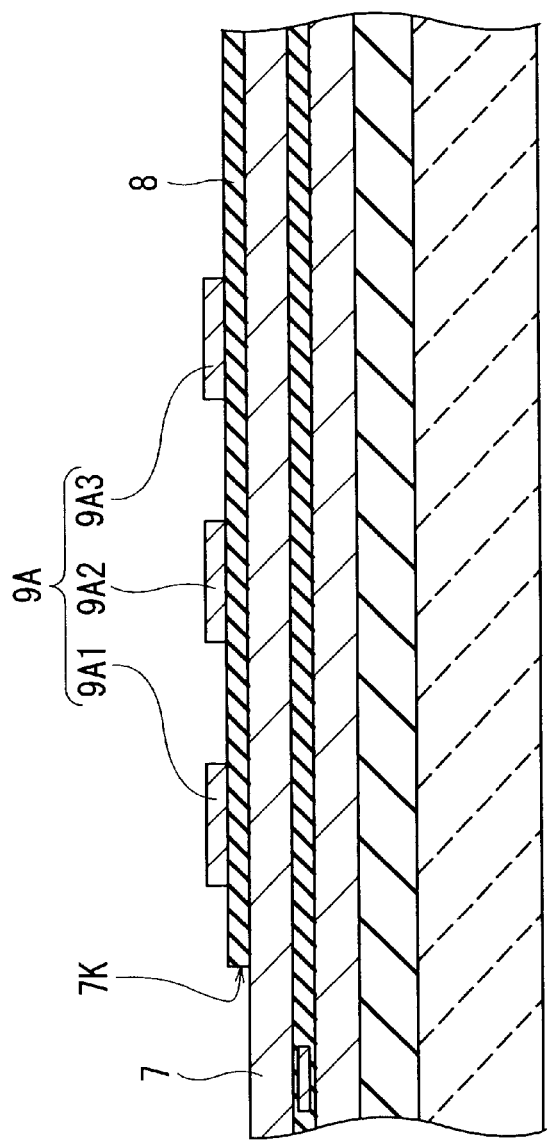
FIG. 2A and FIG. 2B are cross sections for describing a step following the step shown in FIG. 1A and FIG. 1B.
Figure 13:
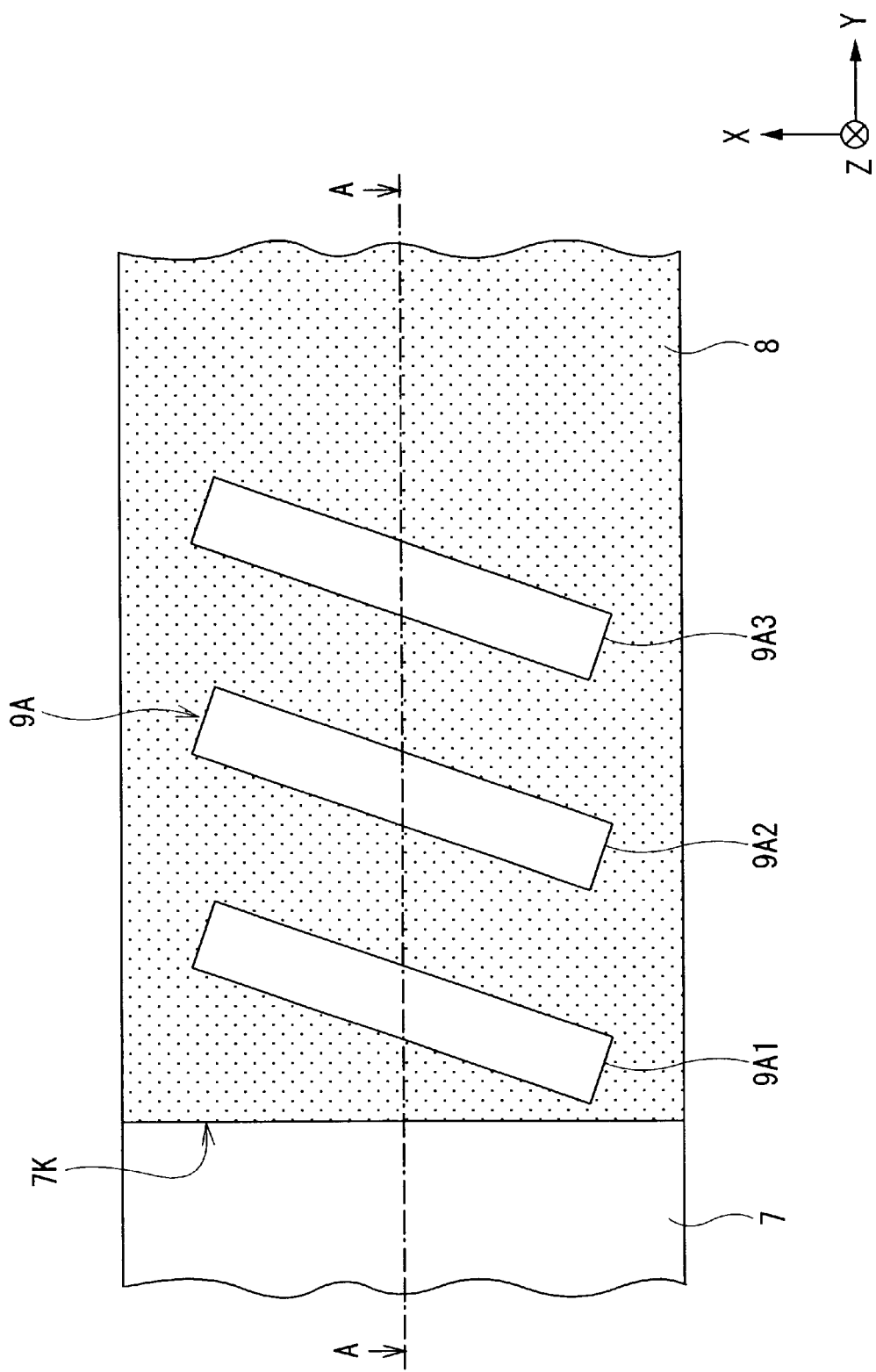
FIG. 13 is a plane view corresponding to the state shown in FIG. 2A and FIG. 2B.

Next, as shown in FIGS. 2A, 2B and FIG. 13, an insulating film 8 about 0.1 μm to 0.2 μm thick made of, for example, alumina is selectively formed on the top shield layer 7 by, for example, sputtering. The insulating film 8 is formed not covering the region (an opening 7K) where another top shield layer 10 (see FIGS. 3A and 3B) is to be formed in the later process.

Next, as shown in FIGS. 2A, 2B and FIG. 13, a plurality of coil parts 9A (for example, 9A1, 9A2, 9A3) about 1.0 μm to 1.5 μm thick made of, for example, copper (Cu) is selectively formed on the insulating film 8, by, for example, frame plating. The coil parts 9A form a part of a thin film coil 9 (see FIGS. 10A, 10B and FIG. 20) and have a plane shape of rectangular band as shown in, for example, FIG. 13. The coil parts 9A are formed to be aligned in a manner so as to be connected in a series of coil parts (9B, 9C, 9D, 9E), which will be formed in the later process, and so that the thin film coil 9 is formed ultimately as an aggregation of the coil parts. More specifically, for example, the coil parts 9A in the longitudinal direction is placed to incline towards the width direction (the X-axis direction in the figure). The plane shape of the coil parts 9A is not necessarily limited to rectangular but any modification is possible. Also, the number of the coil parts 9A provided may be changed according to the number of the turns of the thin film coil 9, which will be described later, wound around the bottom pole 13 and a top pole 17 which will be described later.

At the time of forming the coil parts 9A by frame plating, first, an electrode film as a seed layer in electroplating is formed on the insulating film 8 by, for example, sputtering. For example, the same material (copper) as that of the coil parts 9A is used for forming the electrode film. Then, after forming a photoresist film by applying photoresist on the above-mentioned electrode film, a photo mask for exposure is selectively formed thereon. The photo mask is formed to have a plane shape corresponding to that of the coil parts 9A and to be aligned in a manner corresponding to the position of the coil parts 9A. Next, exposure process is applied to the photoresist film using the photo mask. Then, a frame pattern for forming the coil parts 9A is selectively formed by developing the photoresist film. Then, the coil parts 9A are selectively formed by electroplating of copper using the frame pattern as a mask and the electrode film formed in the earlier process as a seed layer. At last, the frame pattern is removed after forming the coil parts 9A.

Next, in FIGS. 3A and 3B, a top shield layer 10 about 2.5 μm to 3.0 μm thick made of, for example, permalloy is selectively formed on the opening 7K by, for example, frame plating. Then, a precursor insulating film 11P about 3.0 μm to 4.0 μm thick made of, for example, alumina is formed by, for example, sputtering so as to cover the uneven region formed by the coil parts 9A, the top shield layer 10 and the like. The precursor insulating film 11P is a layer prepared to be an insulating film 11 by being polished in the later process.

Figure 14:
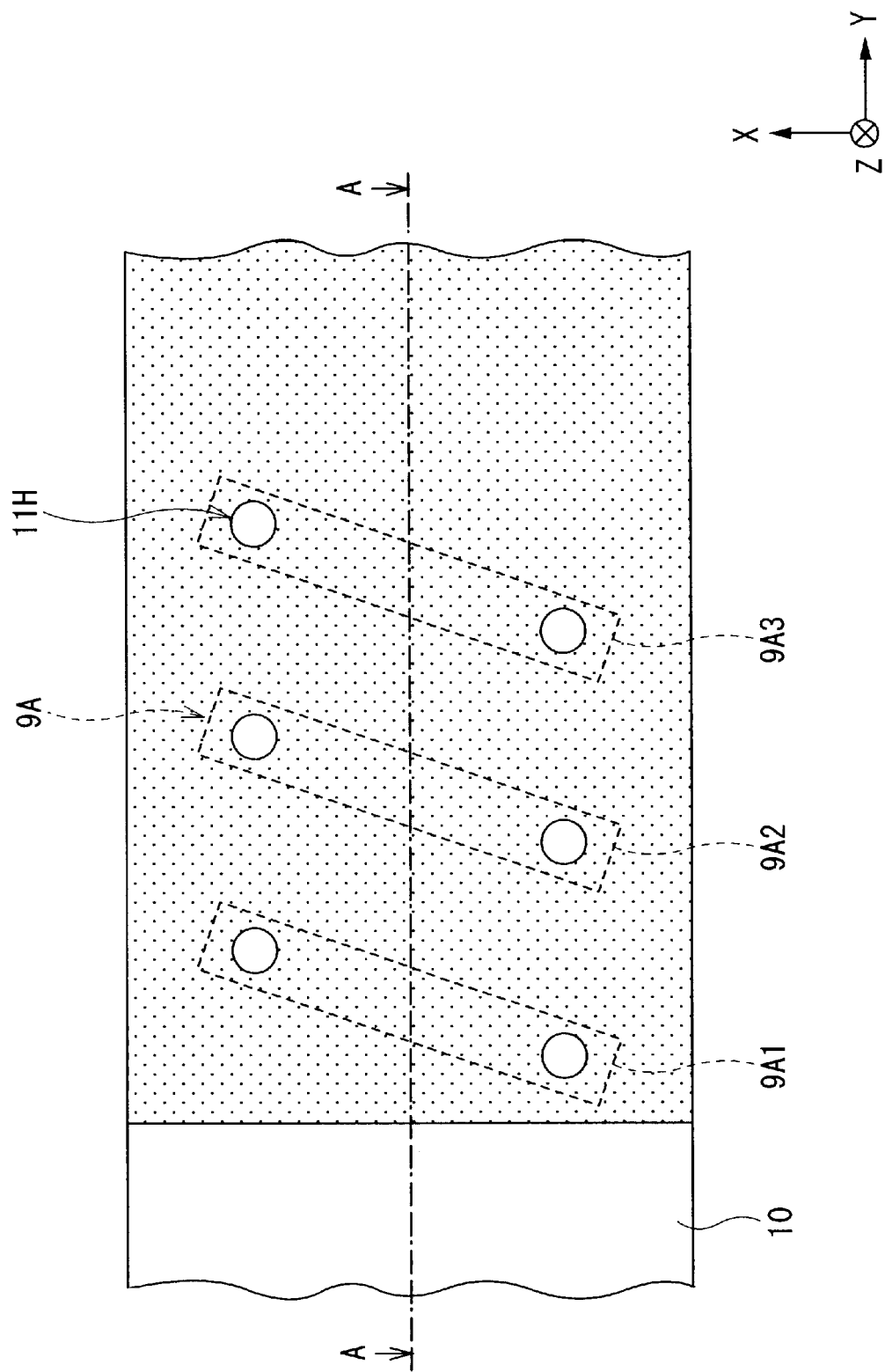
FIG. 14 is a plane view corresponding to the state shown in FIG. 4A and FIG. 4B.

Next, an insulating film 11, which buries the coil parts 9A or the like as shown in FIGS. 4A, 4B and FIG. 14, is formed by planarizing the whole precursor insulating film 11P through polishing by, for example, CMP (Chemical Machine Polishing). When forming the insulating film 11, polishing is performed at least until the top shield layer 10 is exposed.

Next, as shown in FIG. 14, a plurality of contact holes 11H having an opening shape of, for example, circle is formed through selectively etching the portion of the insulating film 11 corresponding to the region near the both ends of the coil parts 9A (9A1, 9A2, 9A3) by, for example, reactive ion etching (simply referred to as RIE in the followings). When forming the contact holes 11H, etching is performed until the coil parts 9A are exposed. The contact holes 11H are for connecting the coil parts 9A to the coil parts 9B (see FIG. 17 and FIG. 21) which will be formed in the later process. The opening shape of the contact holes 11H is not necessarily limited to circle but any other shapes can be applicable.

Figure 15:
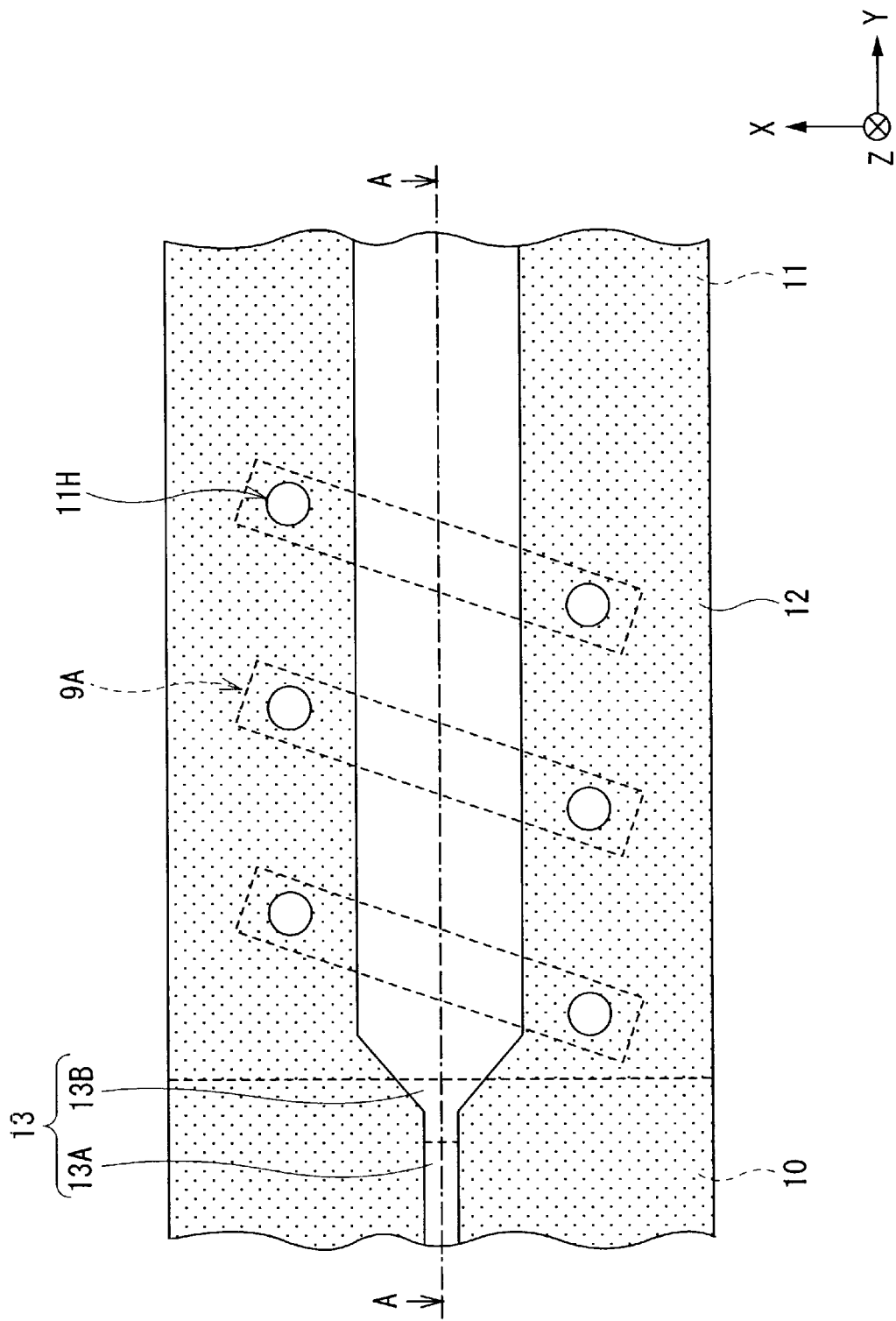
FIG. 15 is a plane view corresponding to the state shown in FIG. 5A and FIG. 5B.

Next, as shown in FIGS. 5A, 5B and FIG. 15, an insulating film 12 about 0.1 μm to 0.2 μm thick made of, for example, alumina is formed all over by, for example, sputtering. The insulating film 12 is formed so as not to cover the contact holes 11 formed in the earlier process as shown in FIG. 15.

Next, as shown in FIGS. 5A, 5B and FIG. 15, a bottom pole 13 about 2.0 μm to 3.0 μm thick made of, for example, permalloy is selectively formed on the region of the insulating film 12 surrounded by a group of the contact holes 11 so as to cross over all the coil parts 9A by, for example, frame plating. As shown in, for example, FIG. 15, the bottom pole 13 is formed to include a front portion 13A and a rear portion 13B in this order from the side which will be the air bearing surface 20 in the later process. Specifically, the bottom pole 13 has a configuration in which, for example, the front portion 13A has a minute uniform width for determining the recording track width, and the rear portion 13B has almost a uniform width in the rear portion and becomes narrower in the front portion as getting closer to the front portion 13A. The bottom pole 13 corresponds to a specific example of "one of the magnetic substances" or "one of the magnetic layers" of the invention.

Figures 6A, 6B:
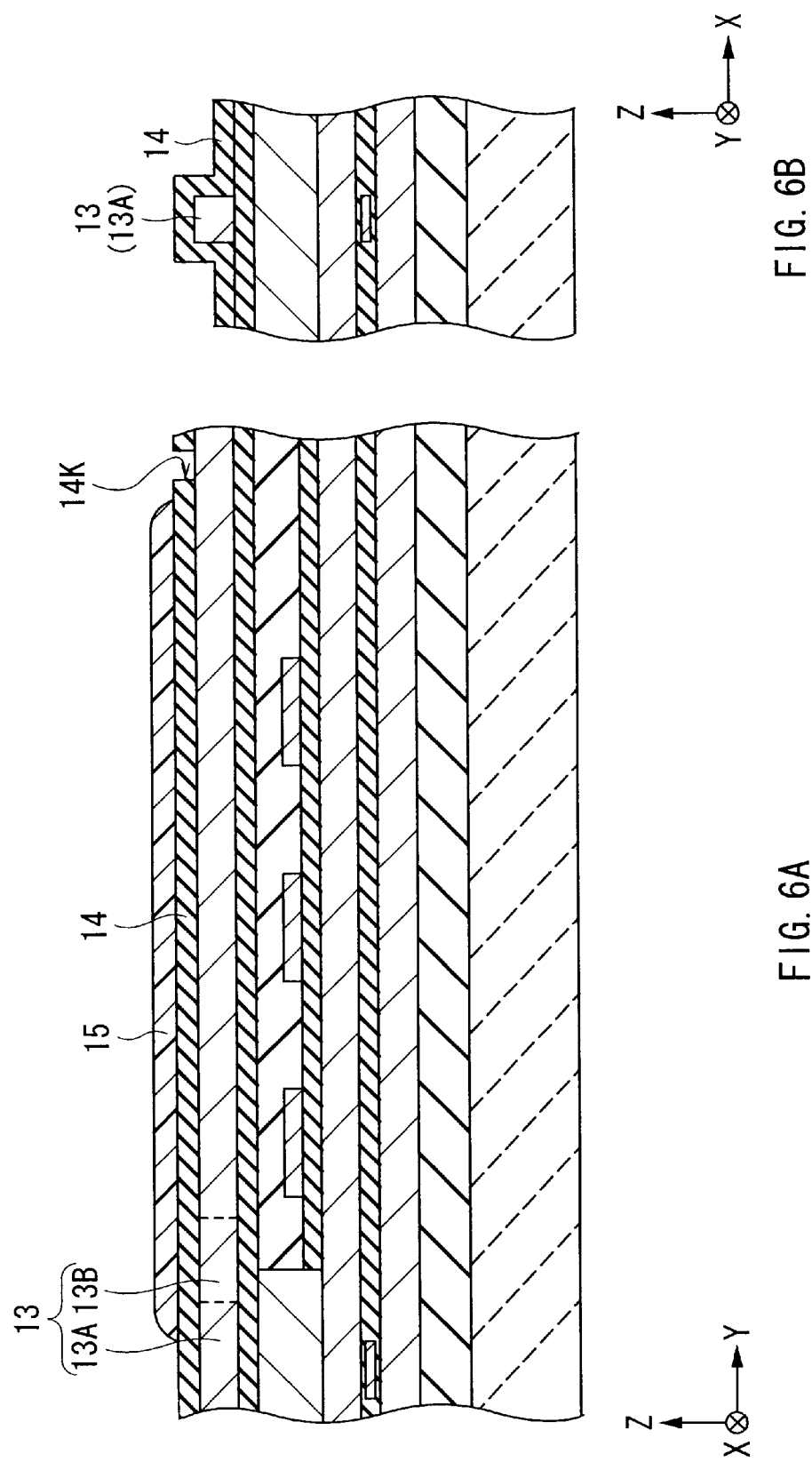
FIG. 6A and FIG. 6B are cross sections for describing a step following the step shown in FIG. 5A and FIG. 5B.
Figure 16:
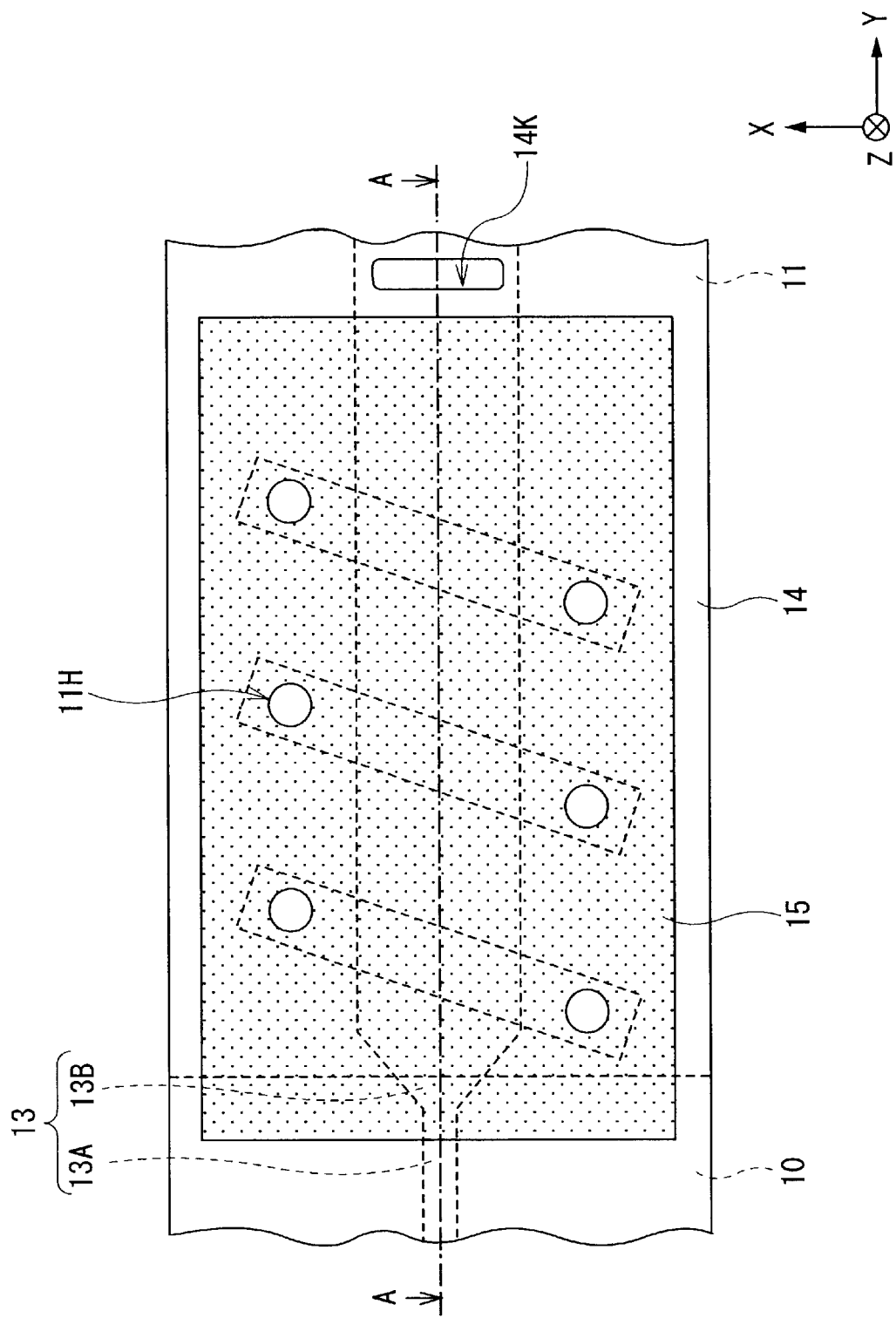
FIG. 16 is a plane view corresponding to the state shown in FIG. 6A and FIG. 6B.

Next, as shown in FIGS. 6A, 6B and FIG. 16, a write gap layer 14 about 0.1 μm to 0.3 μm thick made of, for example, alumina is formed all over by, for example, sputtering. The write gap layer 14 is formed not to cover an opening 14K for connecting the bottom pole 13 to a top pole 17 (see FIGS. 8A, 8B and FIG. 18) which will be formed in the later process. The write gap layer 14 corresponds to a specific example of a "gap" or a "gap layer" of the invention.

Next, an organic material such as photoresist which exhibits liquidity by applying heat is formed on the write gap layer 14 in a predetermined pattern by photolithography with high precision. Then a heat treatment at a range of about 200° C. to 250° C. is applied to the photoresist film. By applying the heat treatment, an insulating film 15 is selectively formed as shown in FIGS. 6A, 6B and FIG. 16.

The insulating film 15 is mainly for electrically isolating the bottom pole 13 and the coil parts 9C which will be formed in the later process. The portion of the insulating film 15 near the end edge becomes a rounded slope caused by the flow of the photoresist at the time of the heat treatment. The insulating film 15 is formed to be aligned in a manner corresponding to the region where the coil parts 9C (see FIGS. 7A, 7B and FIG. 17), which will be formed in the later process, are to be provided. Also, the insulating film 15 is to be formed, as shown in FIG. 16, not to cover the contact holes 11H and the opening 14K formed in the earlier process.

Figure 17:
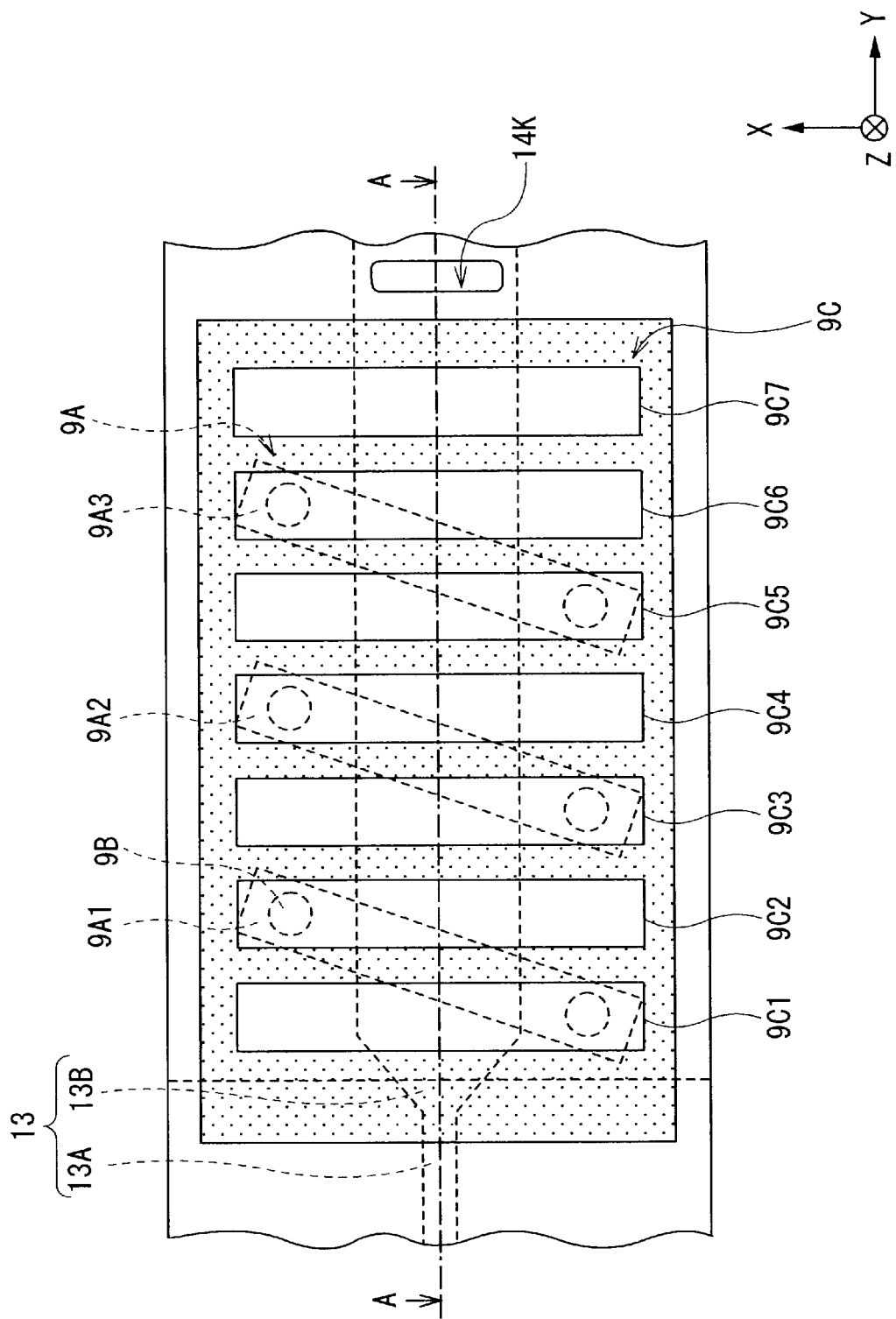
FIG. 17 is a plane view corresponding to the state shown in FIG. 7A and FIG. 7B.

Next, as shown in FIG. 17, a plurality of coil parts 9B forming a part of the thin film coil 9 is selectively formed through growing a plating film made of, for example, copper (Cu) in the contact holes 11H by, for example, electroplating. As shown in FIG. 21, the coil parts 9B are formed to have, for example, a cylindrical structure corresponding to the inner shape of the contact holes 11H.

Figure 7A:
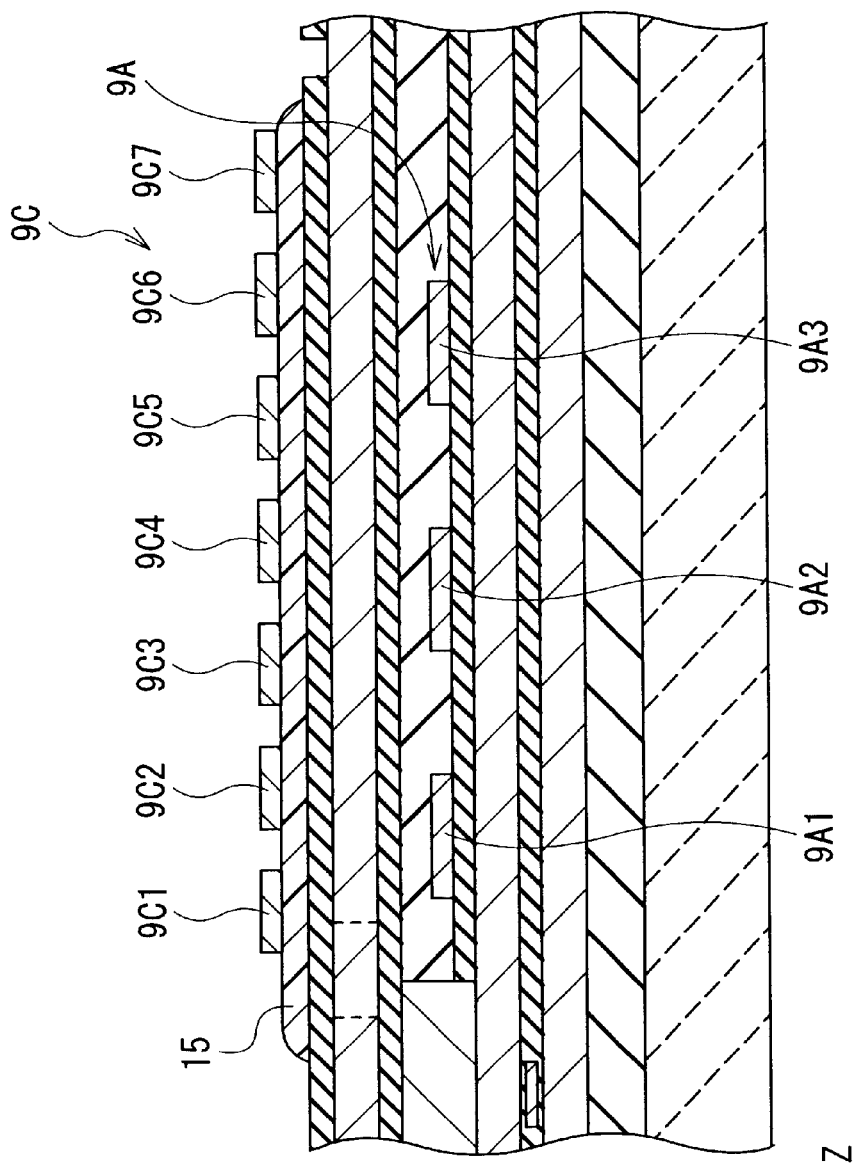
FIG. 7A and FIG. 7B are cross sections for describing a step following the step shown in FIG. 6A and FIG. 6B.
Figure 7B:
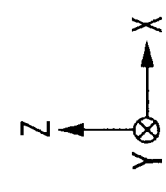

Next, as shown in FIGS. 7A, 7B and FIG. 17, a plurality of coil parts 9C (for example, 9C1, 9C2, 9C3, 9C4, 9C5, 9C6, 9C7) about 1.5 μm thick made of, for example, copper (Cu) is selectively formed by, for example, the same frame plating used in the case of forming the coil parts 9A. More specifically, for example, the coil parts 9C have a plane shape of rectangular band and the longitudinal direction of the coil parts 9C is almost orthogonal to the length direction (the Y-axis direction in the figure). When forming the coil parts 9C, one end of the coil parts 9C1 and one end of the coil parts 9A1 are connected through the coil parts 9B, and the other end of the coil parts 9C2 and the other end of the coil parts 9A1 are connected through the coil parts 9B. Thereby, a connecting unit composed of a series of a group of the coil parts (9C1, 9B, 9A1, 9B, 9C2) is formed. Connecting units composed of other groups of the coil parts (9C3, 9B, 9A2, 9B, 9C4, and 9C5, 9B, 9A3, 9B, 9C6) are formed in the same manner. Each of the connecting units (the coil parts 9A, 9B, 9C) is wound around the bottom pole 13 (the rear portion 13B) as shown in FIG. 21. In the followings, specifically, the connecting unit composed of the coil parts 9A, 9B and 9C is referred to as a "first winding unit U1" (see FIG. 21 and FIG. 22).

Figure 18:
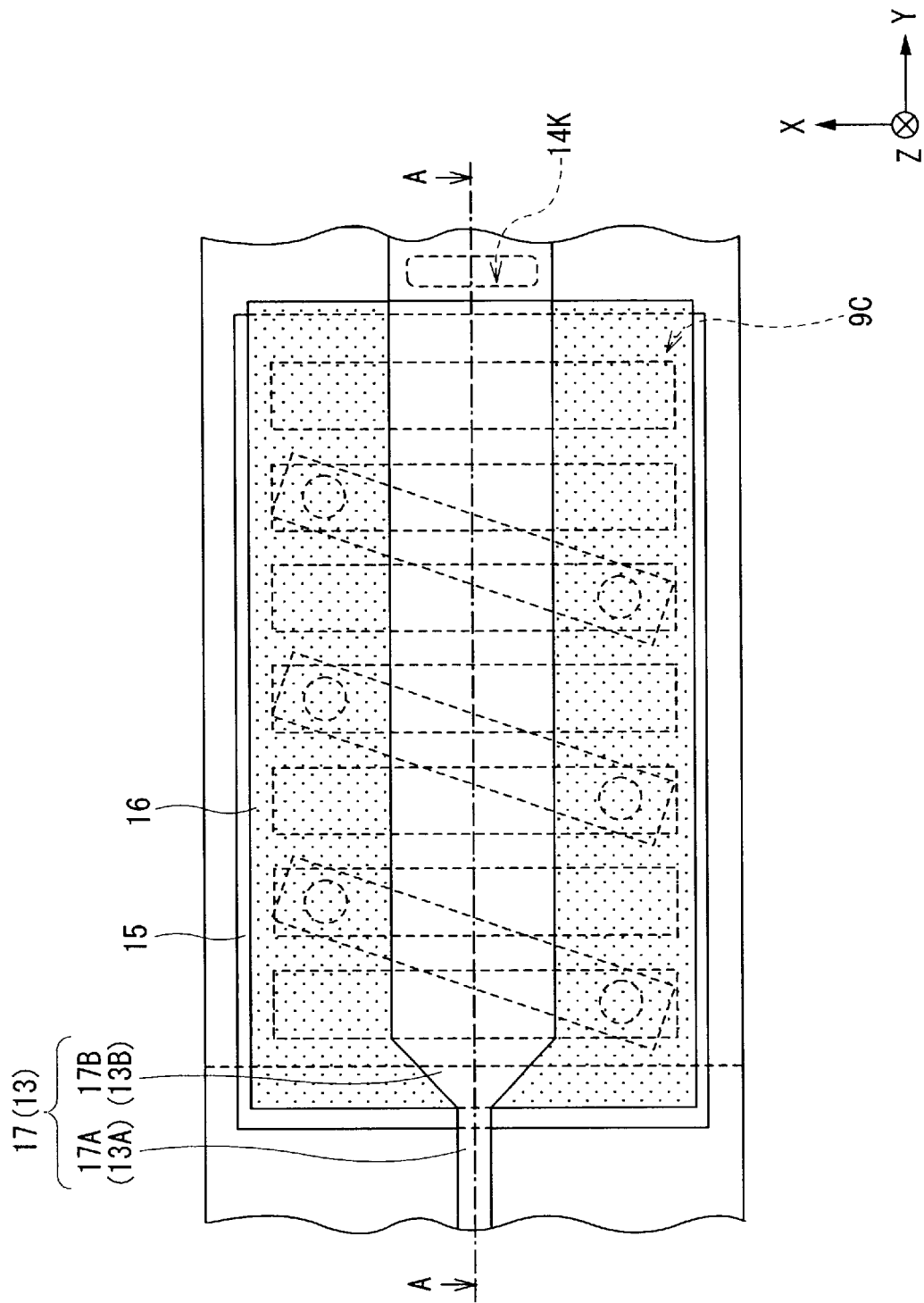
FIG. 18 is a plane view corresponding to the state shown in FIG. 8A and FIG. 8B.

Next, as shown in FIGS. 8A, 8B and FIG. 18, an insulating film 16 is formed to cover the coil parts 9C and the neighboring region using the same material and the same method as the case of forming, for example, the insulating film 15. The coil parts 9C are buried in the insulating film 16.

Next, as shown in FIGS. 8A, 8B and FIG. 18, a top pole 17 about 2.0 μm to 3.0 μm in thick made of, for example, permalloy is selectively formed on the region from the side to be the air bearing surface 20 in the later process to the opening 14K by, for example, frame plating. As shown in, for example, FIG. 18, the top pole 17 is formed to have almost the same configuration (includes a front portion 17A and a rear portion 17B) as the bottom pole 13 (include a front portion 13A and a rear portion 13B) while facing the bottom pole 13 in the thickness direction (the Z-axis direction in the figure). The bottom pole 13 and the top pole 17 are magnetically coupled in the opening 14K and a magnetic path is formed thereby. The front portion 13A having a minute uniform width for determining the recording track width and the front portion 17A are formed to face each other through the write gap layer 14. Thereby, a magnetic pole portion 100 is formed (see FIG. 8B). The top pole 17 corresponds to "the other magnetic substance" or "the other magnetic layer" of the invention.

Figure 9A:
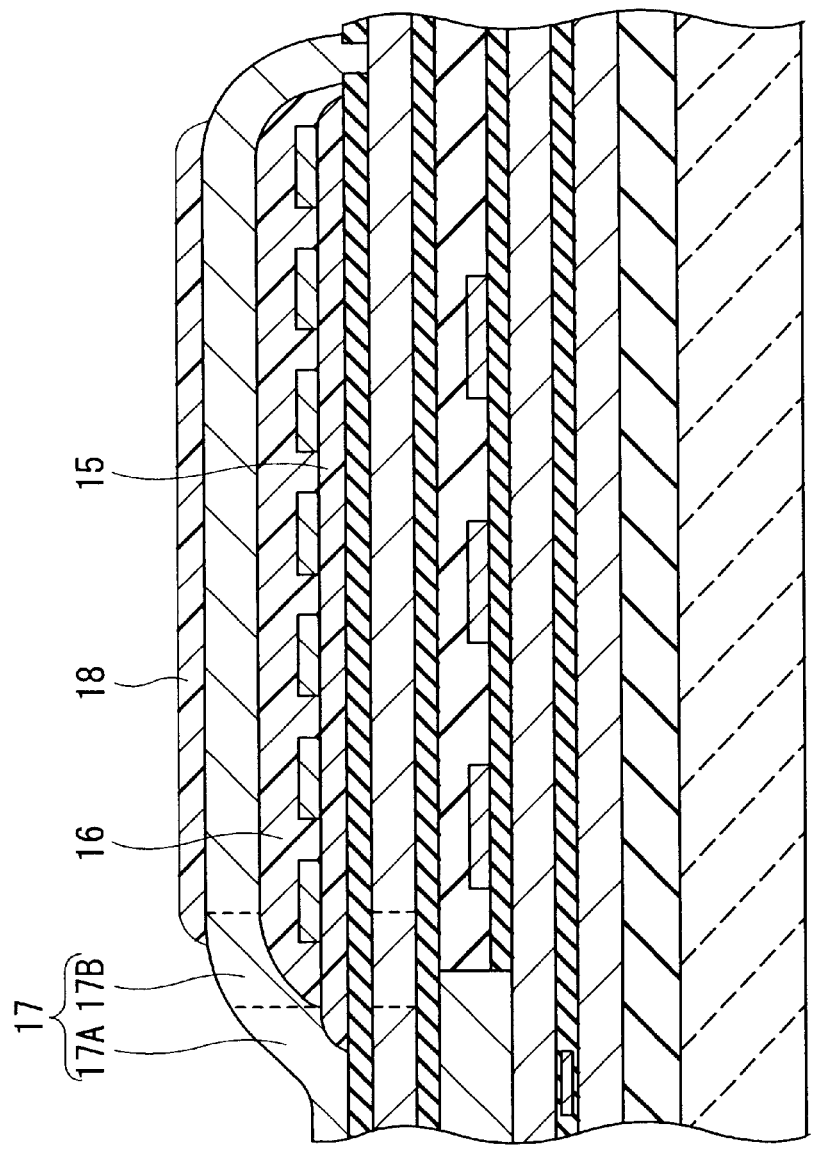
FIG. 9A and FIG. 9B are cross sections for describing a step following the step shown in FIG. 8A and FIG. 8B.
Figure 9B:
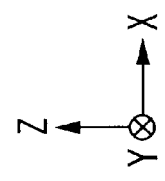
Figure 19:
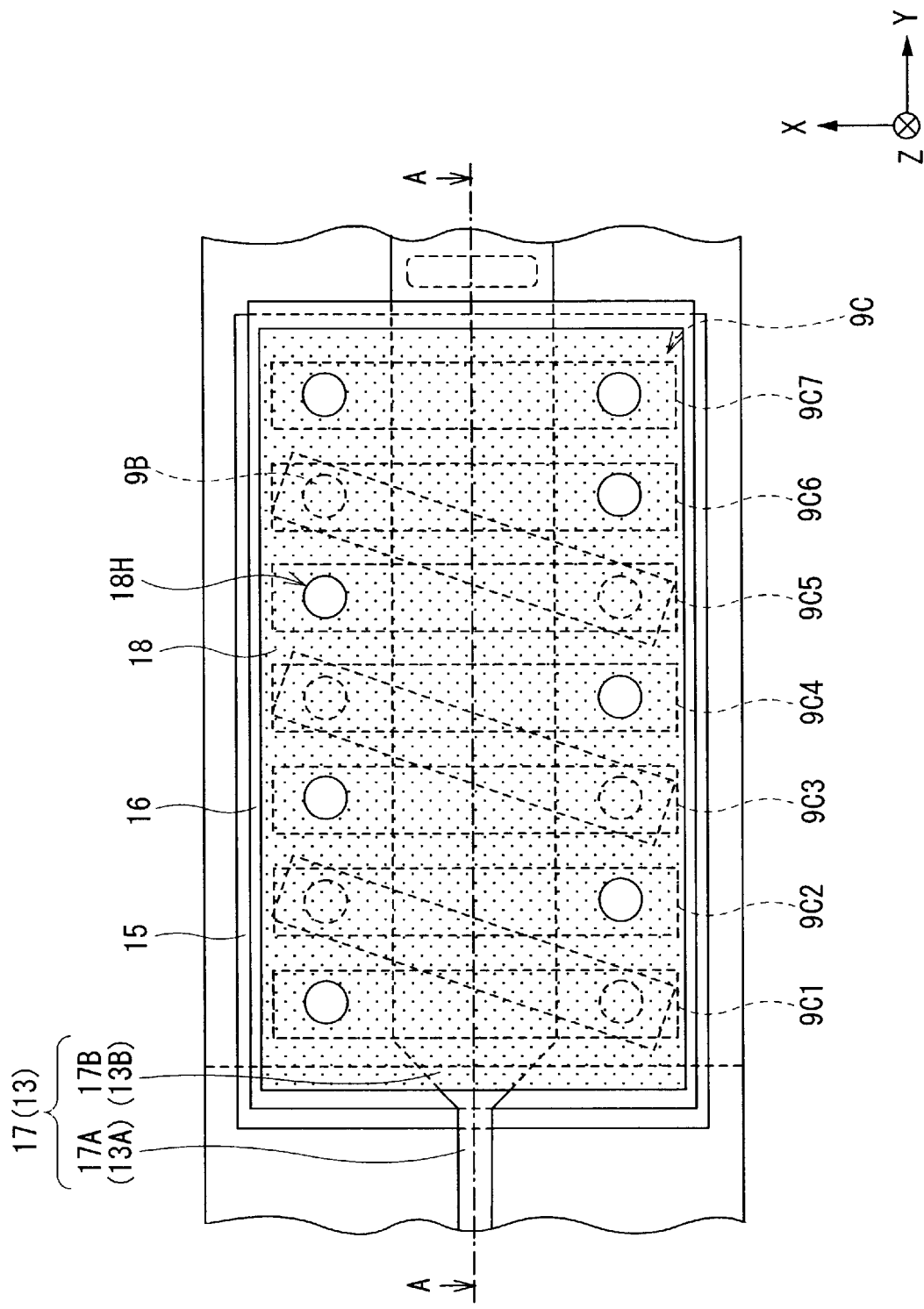
FIG. 19 is a plane view corresponding to the state shown in FIG. 9A and FIG. 9B.

Next, as shown in FIGS. 9A, 9B and FIG. 19, an insulating film 18 is formed on the top pole 17 using the same material and the same method as the case of forming, for example, the insulating film 15. The insulating film 18 is for electrically isolating the top pole 17 and the coil parts 9E (see FIGS. 10A, 10B and FIG. 20) which will be formed in the later process. The insulating film 18 is formed to be aligned in a manner corresponding to the region where the coil parts 9E, which will be formed in the later process, are to be provided. The insulator comprised of the insulating films 11, 12, 15, 16, and 18 corresponds to a specific example of an "insulator" or an "insulating layer" of the invention.

Next, as shown in FIG. 19, a plurality of contact holes 18H having an opening shape of, for example, circle is formed through selectively etching the portion of the insulating films 16, 18 and the top pole 17 corresponding to the region near the end of the coil parts 9C1 to 9C6 where the coil parts 9B are not provided, and the portion corresponding to the both ends of the coil parts 9C7. When forming the contact holes 18H, etching is performed until the coil parts 9C are exposed. The contact holes 18H are mainly for connecting the coil parts 9C and the coil parts 9D (see FIG. 20 and FIG. 21) which will be formed in the later process.

Figure 20:
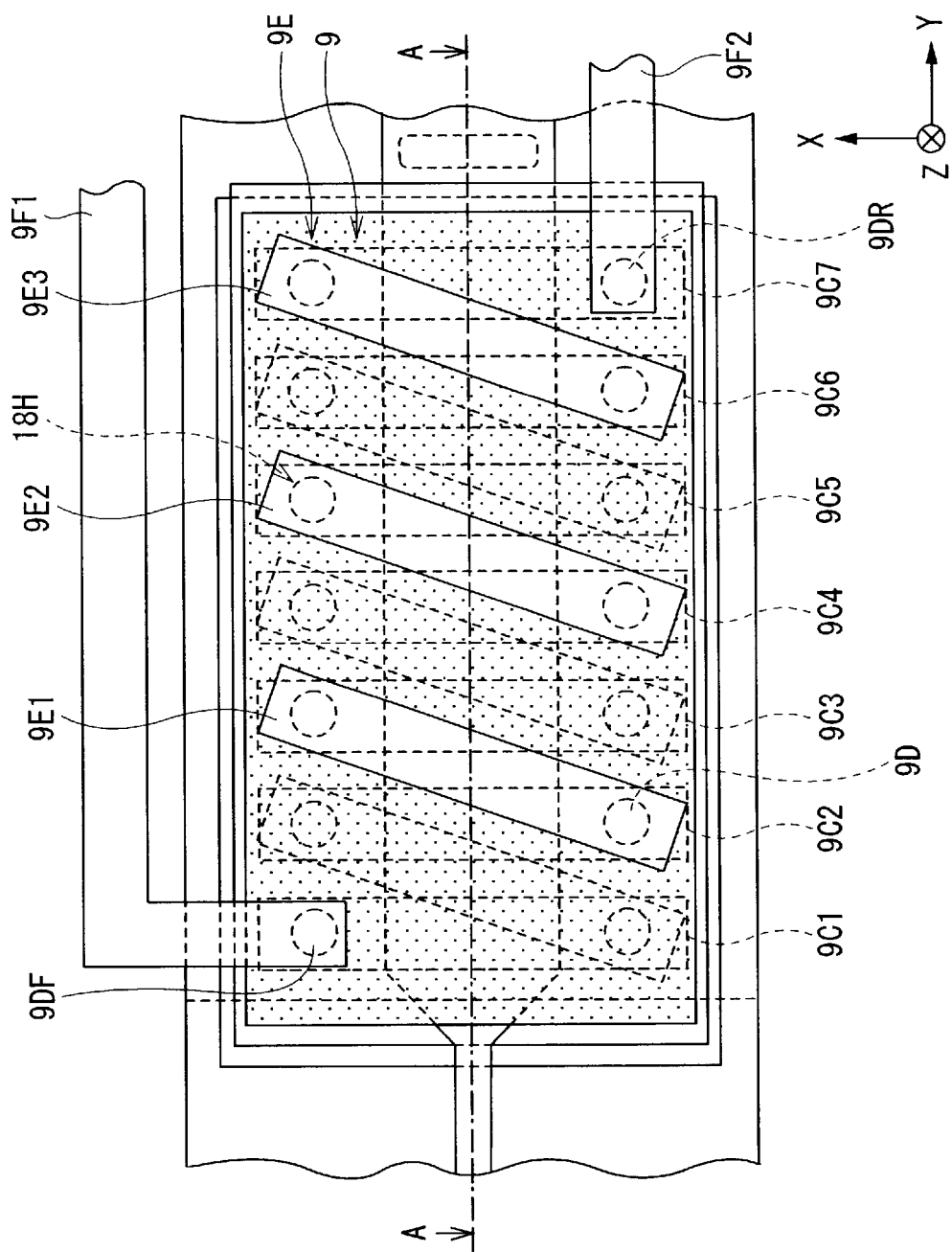
FIG. 20 is a plane view corresponding to the state shown in FIG. 10A and FIG. 10B.

Next, as shown in FIG. 20, a plurality of coil parts 9D is selectively formed through growing a plating film made of, for example, copper (Cu) in the contact holes 18H by, for example, electroplating. As shown in FIG. 21, the coil parts 9D are formed to have, for example, a cylindrical structure corresponding to the inner shape of the contact holes 18H in a manner of same as the case of the coil parts 9B formed in the earlier process.

Figures 10A, 10B:
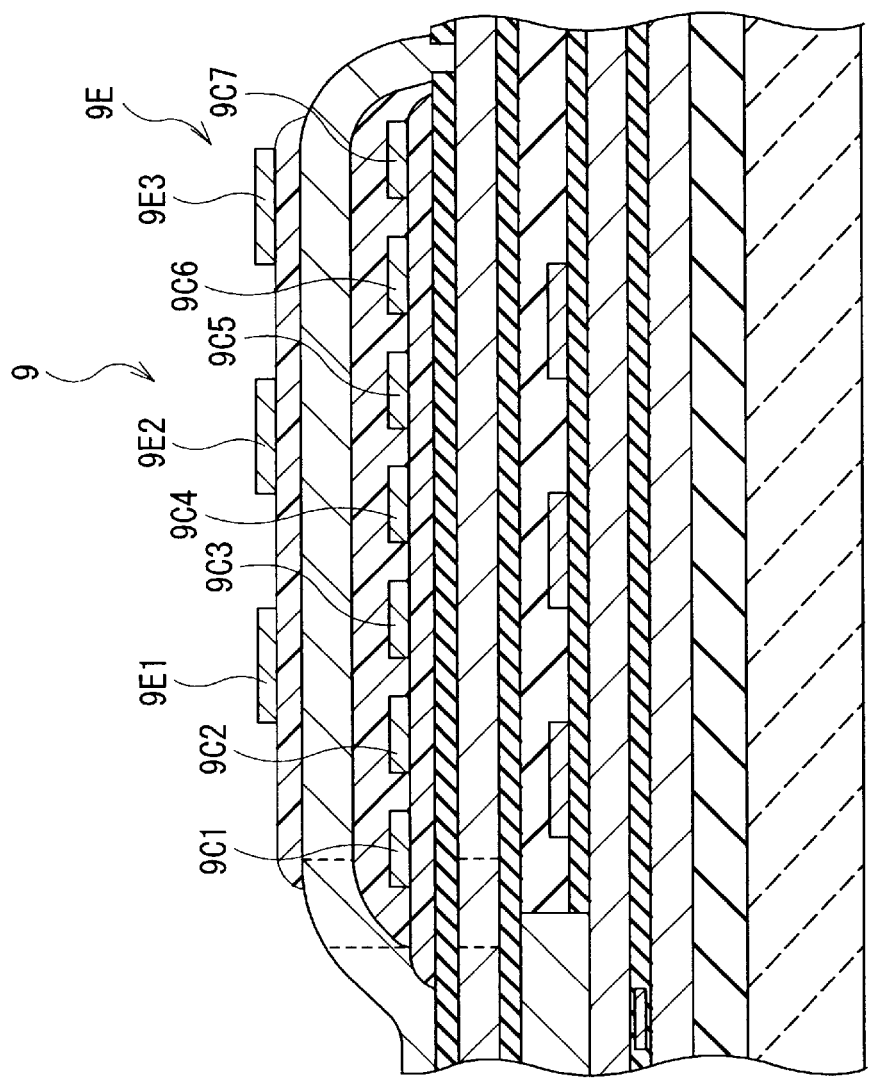
FIG. 10A and FIG. 10B are cross sections for describing a step following the step shown in FIG. 9A and FIG. 9B.

Next, as shown in FIGS. 10A, 10B and FIG. 20, a plurality of coil parts 9E (for example, 9E1, 9E2, 9E3), about 1.5 μm thick made of, for example, copper (Cu) is selectively formed on the insulating film 18 by, for example, frame plating. When forming the coil parts 9E, one end of the coil parts 9E1 and one end of the coil parts 9C2 are connected through the coil parts 9D, and the other end of the coil parts 9E1 and the other end of the coil parts 9C3 are connected through the coil parts 9D. Thereby, a connecting unit composed of a series of a group of the coil parts (9C2, 9D, 9E1, 9D, 9C3) is formed. Connecting units composed of other groups of the coil parts (9C4, 9D, 9E2, 9D, 9C5, and 9C6, 9D, 9E3, 9D, 9C7) are formed in the same manner. Each of the connecting units (the coil parts 9C, 9D, 9E) is wound around the top pole 17 (the rear portion 17B) as shown in FIG. 21. In the followings, specifically, the connecting unit composed of the coil parts 9C, 9D and 9E is referred to as a "second winding unit U2" (see FIG. 21 and FIG. 22).

By forming the coil parts 9E, the thin film coil 9 is formed as an aggregation of a series of the coil parts (9A, 9B, 9C, 9D, 9E). When forming the coil parts 9E, for example, a lead wire 9F1 is formed to be connected to a coil parts 9DF formed in the other end of the coil parts 9C1, and a lead wire 9F2 to be connected to a coil parts 9DR formed in one end of the coil parts 9C7. A material for forming the lead wires 9F1 and 9F2 is, for example, the same material used for the thin film coil 9 such as copper (Cu). When forming the thin film coil 9, it is desirable to have the same winding number of the first winding unit U1 and the second winding unit U2 in order to have the same quantity of the magnetic flux generated in each region near the bottom pole 13 and the top pole 17 and the same timing of generating magnetic flux (see FIG. 22).

Figures 11A, 11B:
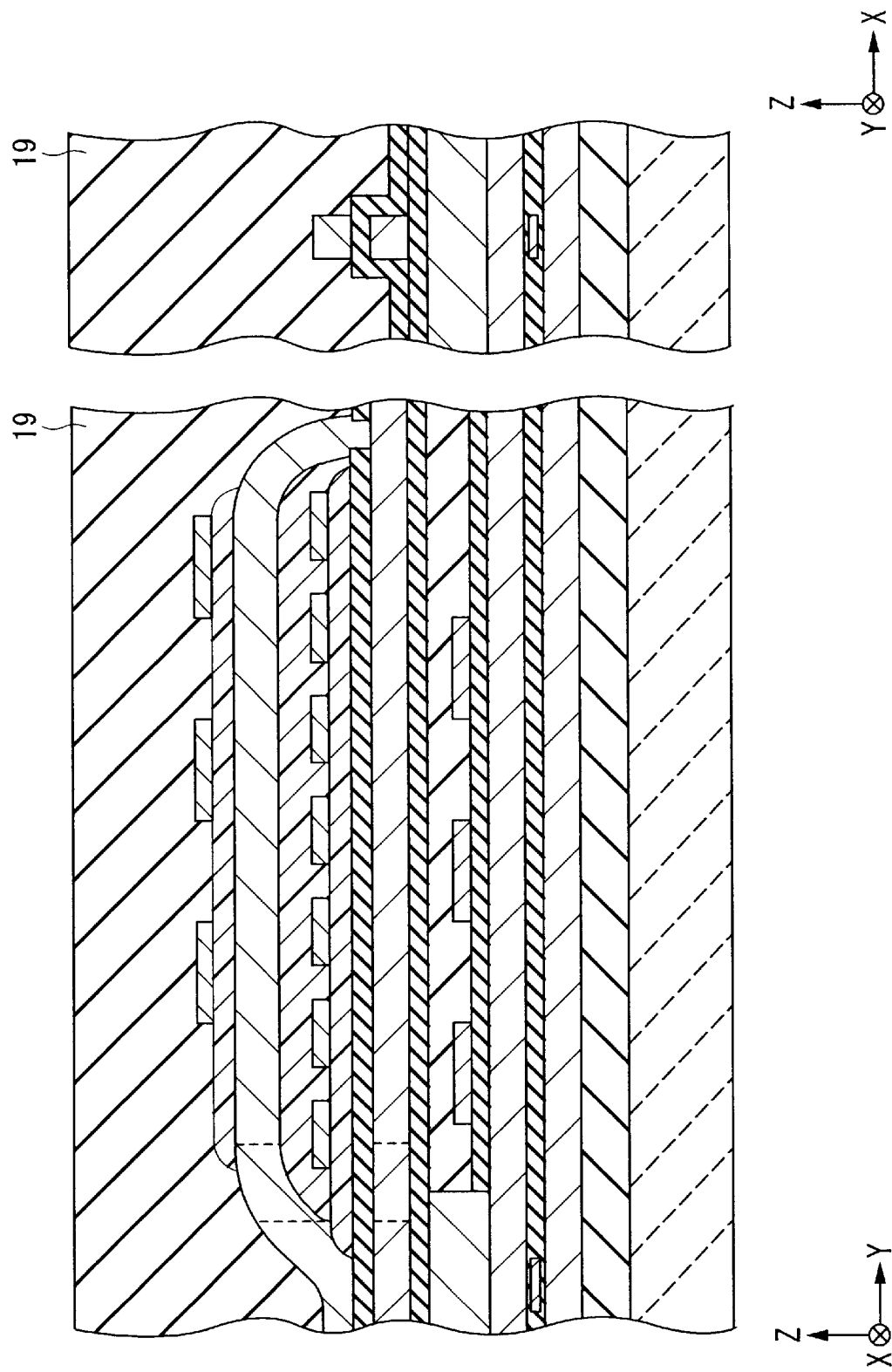
FIG. 11A and FIG. 11B are cross sections for describing a step following the step shown in FIG. 10A and FIG. 10B.

Next, as shown in FIGS. 11A and 11B, an overcoat layer 19 about 20 μm to 40 μm thick made of an insulating material such as alumina, which is an inorganic material, is formed to cover the whole portion.

Figures 12A, 12B:
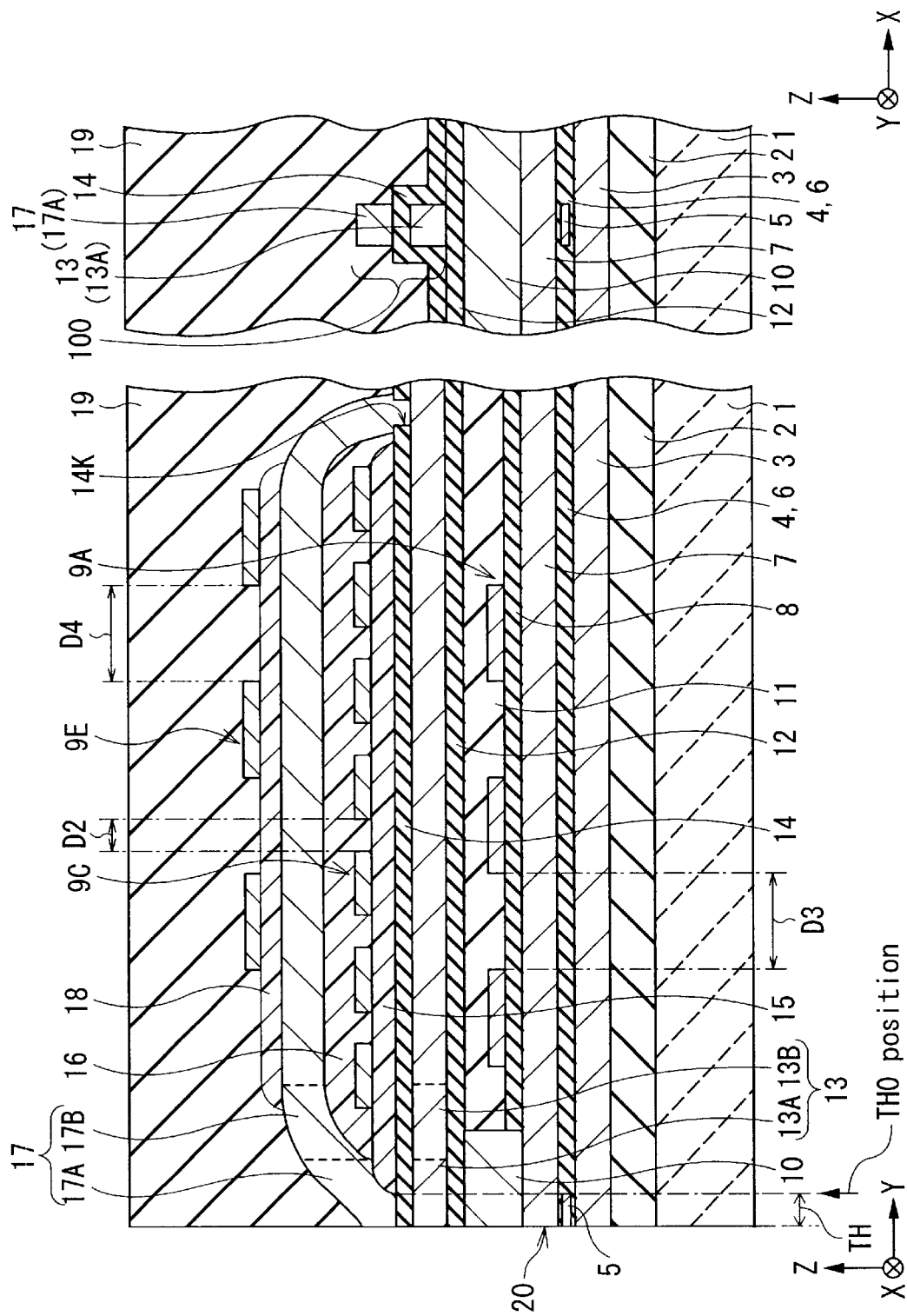
FIG. 12A and FIG. 12B are cross sections for describing a step following the step shown in FIG. 11A and FIG. 11B.

At last, as shown in FIGS. 12A and 12B, the air bearing surface 20 of the recording head and the reproducing head is formed by machine processing and polishing. Thereby, a thin film magnetic head is completed.

<Configuration of a Thin Film Magnetic Head>

Now, the configuration of a thin film magnetic head according to the embodiment will be described referring to FIGS. 12A, 12B, FIG. 21 and FIG. 22.

As shown in FIGS. 12A and 12B, the position of the front end of the insulating film 15 is the throat height 0 position (TH0 position), which is the reference point in defining the throat height (TH) as one of the factors for determining the performance of a recording head. The throat height (TH) is defined as the length from the front end of the insulating film 15 to the air bearing surface 20.

As shown in FIG. 21 and FIG. 22, the thin film coil 9 is, as described above, formed as an aggregation of a series of the coil parts (9A, 9B, 9C, 9D, 9E) being stacked. The thin film coil 9 continuously comprises the first winding unit U1 and the second winding unit U2 alternatively from the air bearing surface 20. Also, the thin film coil 9 extendedly forms a continuum in which the winding units are alternatively wound around the bottom pole 13 (the rear potion 13B) and the top pole 17 (the rear portion 17B). Specifically, for example, the thin film 9 is wound around the bottom pole 13 clockwise in the first winding unit U1, and the thin film coil 9 is wound around the top pole 17 counterclockwise in the second winding unit U2. In other words, the winding path of the thin film coil 9 follows the shape of "8" (see FIG. 22) when viewed from the side close to air bearing surface 20. In the following description, the structure of the thin film coil 9 is specifically referred to as a "balanced winding structure" since the coil is wound around both the bottom pole 13 and the top pole 17 in well balance. Both of the lead wires 9F1 and 9F2 connected in both ends of the thin film coil 9 are connected to an outer circuit (not shown). The thin film coil 9 becomes continuity by the outer circuit.

<Action of a Thin Film Magnetic Head>

Now, action of a thin film magnetic head according to the embodiment will be described by referring to FIGS. 12A, 12B, FIG. 21 and FIG. 22.

In the thin film magnetic head, at the time of recording information, when a current I flows through the thin film coil 9 from the lead wire 9F1 to the lead wire 9F2 via the outer circuit (not shown), magnetic flux J generates. At this time, in the first winding unit U1, the current I flows clockwise so that the flow of the magnetic flux J is generated in the bottom pole 13 propagating towards the rear portion. On the other hand, in the second winding unit U2, the current I flows counterclockwise so that the flow of the magnetic flux J is generated in the top pole 17 propagating towards the front portion. Thereby, the magnetic flux generated in the thin film coil 9 propagates the magnetic path from the bottom pole 13 to the top pole 17 (the front portion 17A) and at last reaches the top tip of the front portion 17A on the side close to air bearing surface 20. By the magnetic flux reached the top tip of the front portion 17A, a signal field for recording is generated outside near the write gap layer 14. By flowing the current I inversely from the lead wire 9F2 to the lead wire 9F1, magnetic flux propagates in the magnetic path from the top pole 17 to the bottom pole 13. Thereby, a signal field is generated in the opposite direction to the above-mentioned case. A magnetic recording medium is partially magnetized by the signal fields and the information can be recorded.

On the contrary, at the time of reproducing information, sense current is flown into the MR film 5. The resistance value of the MR film 5 changes according to a reproducing signal field of the magnetic recording medium. By detecting the change in the resistance value as the change in the sense current, information recorded in the magnetic recording medium can be read out.

<Operation and Effects of the Embodiment>

Figures 23A, 23B:
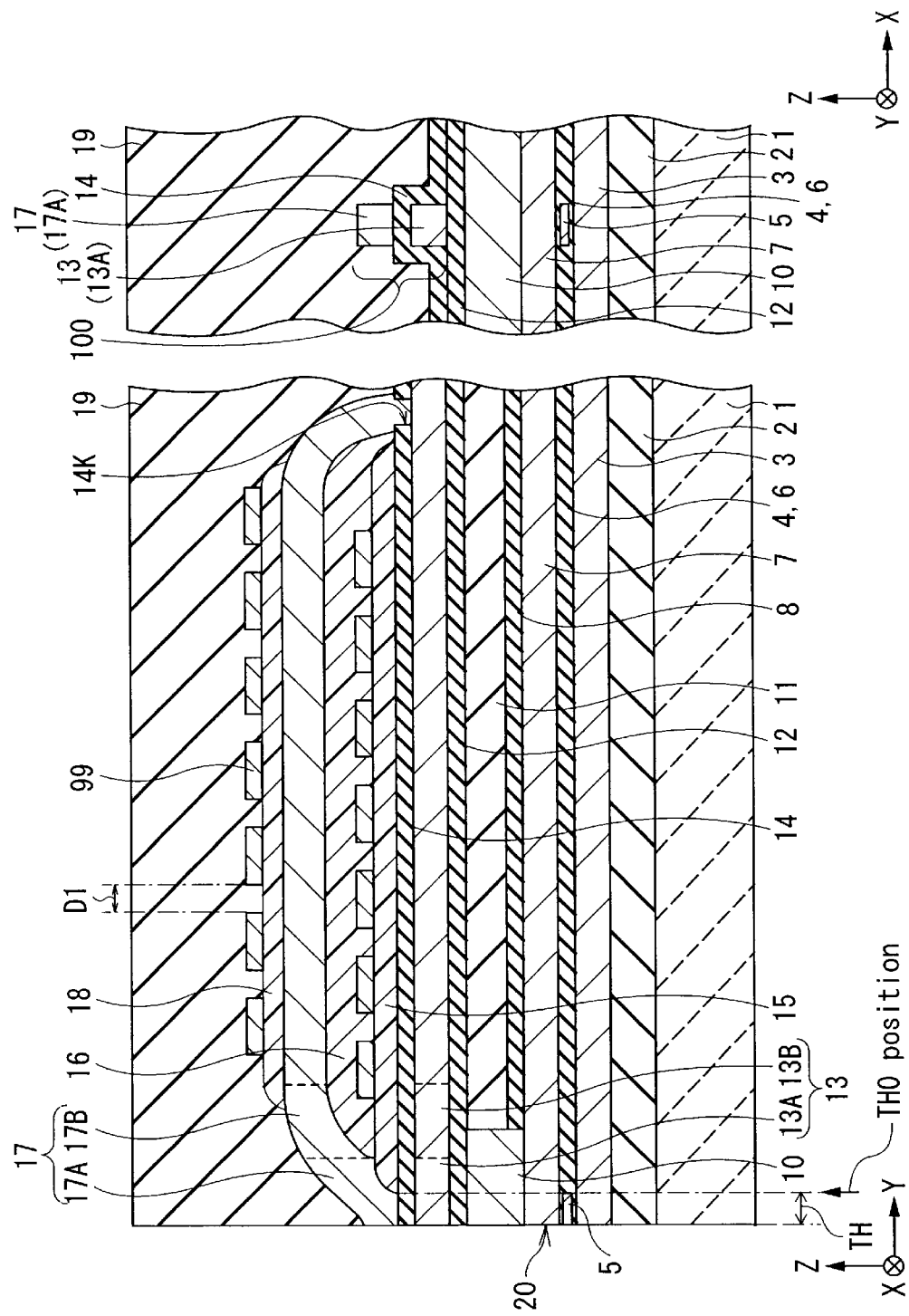
FIG. 23A and FIG. 23B are cross sections for showing the configuration of a thin film magnetic head as a comparison to a thin film magnetic head according to the embodiment.

Now, operation and effects of the embodiment will be described by referring to FIGS. 12A, 12B and FIG. 23. FIG. 23 corresponds to FIGS. 12A and 12B, compared showing a cross sectional configuration of a thin film magnetic head to a thin film magnetic head according to the embodiment. FIG. 23 shows a case of a helical structure in which, for example, a thin film coil 99 is wound around the top pole 17 (a rear portion 17B). In the embodiment, as shown in FIGS. 12A and 12B, the thin film coil 9 has a balanced winding structure which continuously comprises the first winding unit U1 and the second winding unit U2 alternatively and extends in the extending direction of the bottom pole 13 and the top pole 17. Therefore, the manufacturing time of a thin film magnetic head can be shortened and the yield can be improved because of the following reasons.

In order to achieve miniaturization of a thin film magnetic head, it is necessary to miniaturize the thin film coil by making the spaces between the turns of the coils narrower. The vantage point of manufacturing a thin film magnetic head (see FIG. 23) that has the thin film coil 99 of helical structure is that the region occupied by the coil (occupied region) is smaller than that of a spiral structure. On the other hand, the spaces between the turns of the coils are made closer, so that a distance D1 between each turn becomes short. Therefore, high precision is required in forming the thin film coil 99. In this case, if the forming precision of the coils is not sufficient or there is a small shift in the forming precision at the time of forming the coils, short circuit or the like occurs because of contact between the turns of the coils. As a result, yield of the thin film magnetic head may decrease.

A method of forming the thin film coil 99 with high precision is, for example, to planarize the surface of the undercoating by polishing in the region where the thin film coil 99 is formed. It is to suppress the bad influence of the reflecting light by planarizing the surface of the undercoating. Such bad influence occurs, for example, when the surface of the undercoating is uneven, precision of forming the frame pattern deteriorates, being influenced by the reflecting light from the surface of the undercoating in the oblique direction or lateral direction in the exposure step for forming the frame pattern when forming the thin film coil by, for example, frame plating. However, if polishing is performed, the number of manufacturing steps is increased. Therefore, the manufacturing time of a thin film magnetic head becomes longer. In short, with the thin film magnetic head shown in FIG. 23, it is difficult to achieve miniaturization of the thin film coil 99 and improving yield at the same time.

On the contrary, in the embodiment, as shown in FIGS. 12A and 12B, although a distance D2 (almost D2=D1) between the coil parts 9C become narrower in accordance with miniaturization of the thin film coil 9, a distance D3 between the coil parts 9A and a distance D4 (almost D3=D4) between the coil parts 9E are sufficiently ensured. In this case, high precision is required in forming the coil parts 9C. However, the precision to form the coil parts 9A and 9E needs not to be as high as the precision required to form the coil parts 9C. Therefore, in the embodiment, the portion of the thin film coil 9 which requires high precision is decreased compared to the aforementioned thin film magnetic head shown in FIG. 23. As a result, the possible problem such as short circuit is reduced and yield of the thin film magnetic head is improved. The region (occupied region) occupied by the thin film coil 9 having a balanced winding structure becomes a little larger than the occupied region of the thin film coil 99 having a helical structure shown in FIG. 23. However, the occupied region becomes considerably smaller compared to a thin film coil having a spiral structure. Therefore, miniaturization of the thin film coil 9 can be achieved.

Furthermore, in the embodiment, since high precision is not required in forming the coil parts 9A and 9E, it is not necessary to perform polishing in the step of forming the coil parts 9A and 9E. Therefore, the number of manufacturing steps can be decreased by simplifying the formation of the thin film coil 9 and the manufacturing time of a thin film magnetic head can be shortened. In other words, unlike a thin film magnetic head (Japanese unexamined Patent Application Publication No. Hei 5-242429, Japanese Utility Model No. 3033043, Japanese unexamined Patent Application Publication No. Hei 5-101337) referred to as an example in the paragraph of the related art, in a thin film magnetic head according to the embodiment, miniaturization of the coil and improving yield and the like can be properly achieved at the same time.

Figure 24:
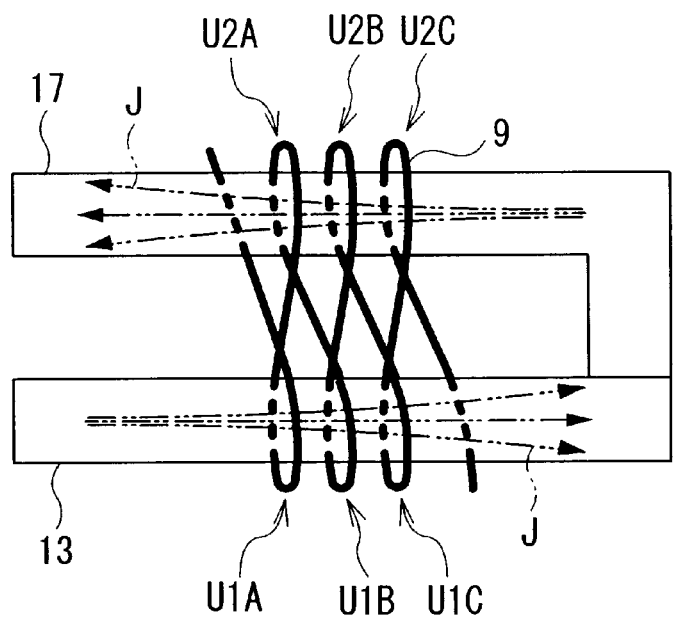
FIG. 24 is a figure showing a configuration of a thin film magnetic head according to the embodiment.
Figure 25:
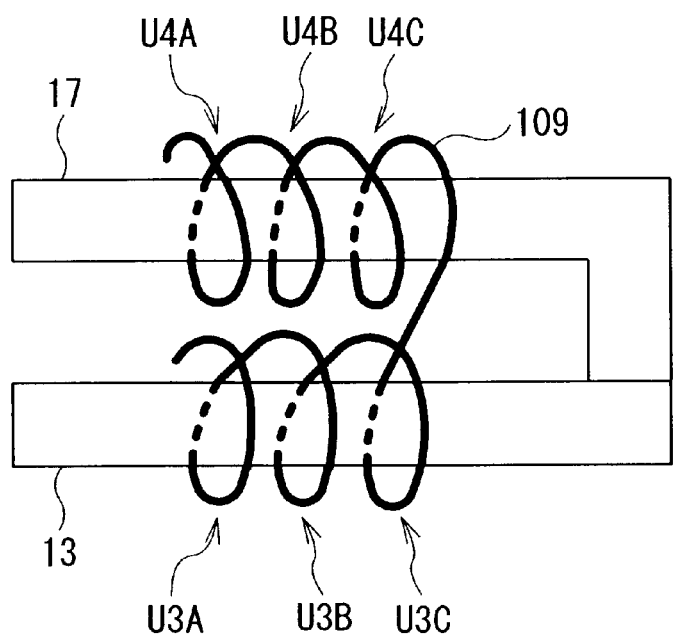
FIG. 25 is a figure showing a configuration of a thin film magnetic head as another comparison to a thin film magnetic head according to the embodiment.

The embodiment also shows an advantage in respect to suppressing noise occurred because of the generating timing of magnetic flux. FIG. 24 shows a configuration of a thin film magnetic head according to the embodiment and FIG. 25 shows a configuration of a thin film magnetic head as an example different from the thin film magnetic head according to the embodiment. A thin film coil 109 (whose winding number is, for example, six) shown in FIG. 25 has a helical structure and forms a continuum of connected winding units. The winding units U3A, U3B and U3C are wound around the bottom pole 13 along the extended direction and winding units U4A, U4B and U4C wound around the top pole 17 along the extended direction. In the thin film coil 109, the interval of magnetic flux generation between the bottom pole 13 and the top pole 17 becomes longer when the current flows. That is, when the current flows through the thin film coil 109, the generating region of magnetic flux shifts from the winding unit U3A, to U3B, U3C, U4C, U4B and to U4A in this order. Magnetic flux is generated in the region (U3A, U3B, U3C) of the bottom pole 13 and then the magnetic flux is generated in the region (U4A, U4B, U4C) of the top pole 17. In this case, timing of generating magnetic flux becomes notably different in the bottom pole 13 and the top pole 17. Therefore, heterogeneous shift of magnetic walls occurs and noise after write such as popcorn noise is generated.

On the contrary, in the embodiment (see FIG. 24), if the winding number of the thin film coil is the same (which is six) as that of the thin film coil 109, the generating region of magnetic flux shifts from U1A, to U2A, U1B, U2B, U1C and to U2C in this order, and timing of generating magnetic flux becomes uniform as a whole magnetic pole including the bottom pole 13 and the top pole 17. Thereby, noise after write such as popcorn noise can be suppressed unlike the case of the comparison described above.

Figure 26:
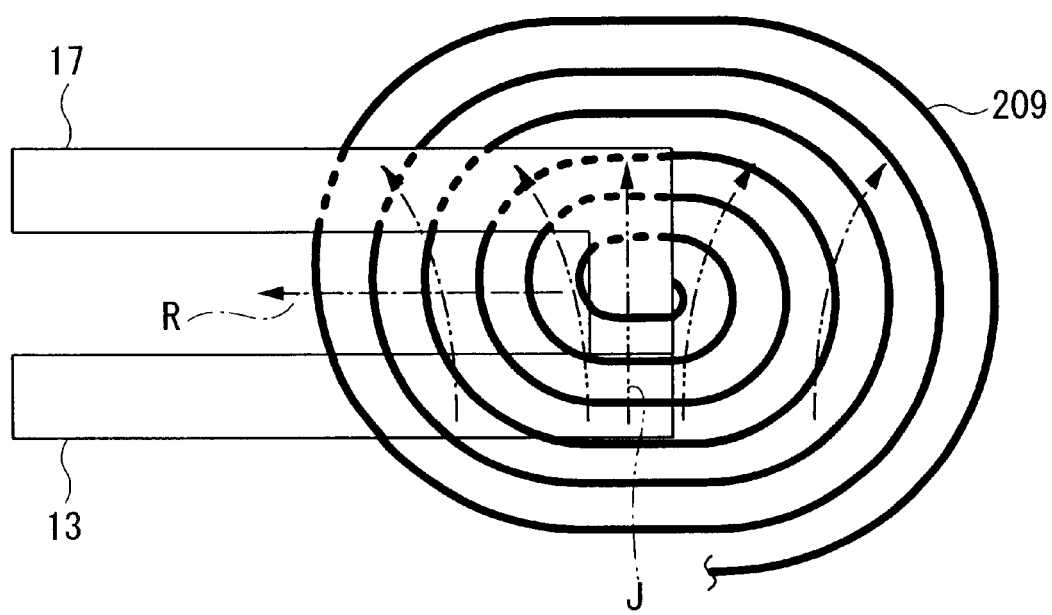
FIG. 26 is a figure showing a configuration of a thin film magnetic head as still another comparison to a thin film magnetic head according to the embodiment.

In the embodiment, since the thin film coil 9 has a balanced winding structure, not only the above-mentioned noise is suppressed, but also the recording performance is stabilized. FIG. 26 shows a configuration of a thin film magnetic head further compared to a thin film magnetic head according to the embodiment, and a thin film coil 209 has, for example, a spiral structure. In the thin film coil 209 having a spiral structure, the holding efficiency of the magnetic flux J in the bottom pole 13 and the top pole 17 composing the magnetic path is not sufficient, i.e., the proportion of a quantity of magnetic flux J2 held in the parts composing the magnetic path against a quantity of magnetic flux J1 generated in the thin film coil 209 (J2/J1) is not sufficient. It is because, when the magnetic flux J is generated in the thin film coil 209, the magnetic flux J generated in the rear of the bottom pole 13 and the top pole 17 is hardly held in the parts composing the magnetic path.

On the contrary, in the embodiment (see FIG. 24), the magnetic flux J generated in the thin film coil 9 is sufficiently held in the parts composing the magnetic path since the whole portion of the thin film coil 9 is wound closely around the bottom pole 13 and the top pole 17. Therefore, the holding efficiency of the magnetic flux J in the parts composing the magnetic path is improved. Thereby, magnetic flux density in the front portion 17A of the top pole 17 is increased and the stable recording performance can be obtained.

Furthermore, the embodiment is advantageous in respect to a high-frequency response characteristic of a thin film magnetic head. In general, a high-frequency response characteristic of a thin film magnetic head improves as the coil inductance of the thin film coil becomes smaller. It is known that the coil inductance of the thin film coil decreases as, for example, radius (radius of the coil) of the ring-shaped portion of the thin film coil becomes smaller. In the thin film coil 209 (see FIG. 26) having a spiral structure, radius of the coil increases as the winding number of the coil increases so that the high-frequency response characteristic is deteriorated. On the contrary, radius of the thin film coil 9 (shown in FIG. 24) is smaller than the case of the thin film coil 209 so that radius of the coil can be maintained even in the case where the winding number of the coil is increased. Therefore, the coil inductance can be made smaller and the high-frequency response characteristic can be improved.

Figure 27:
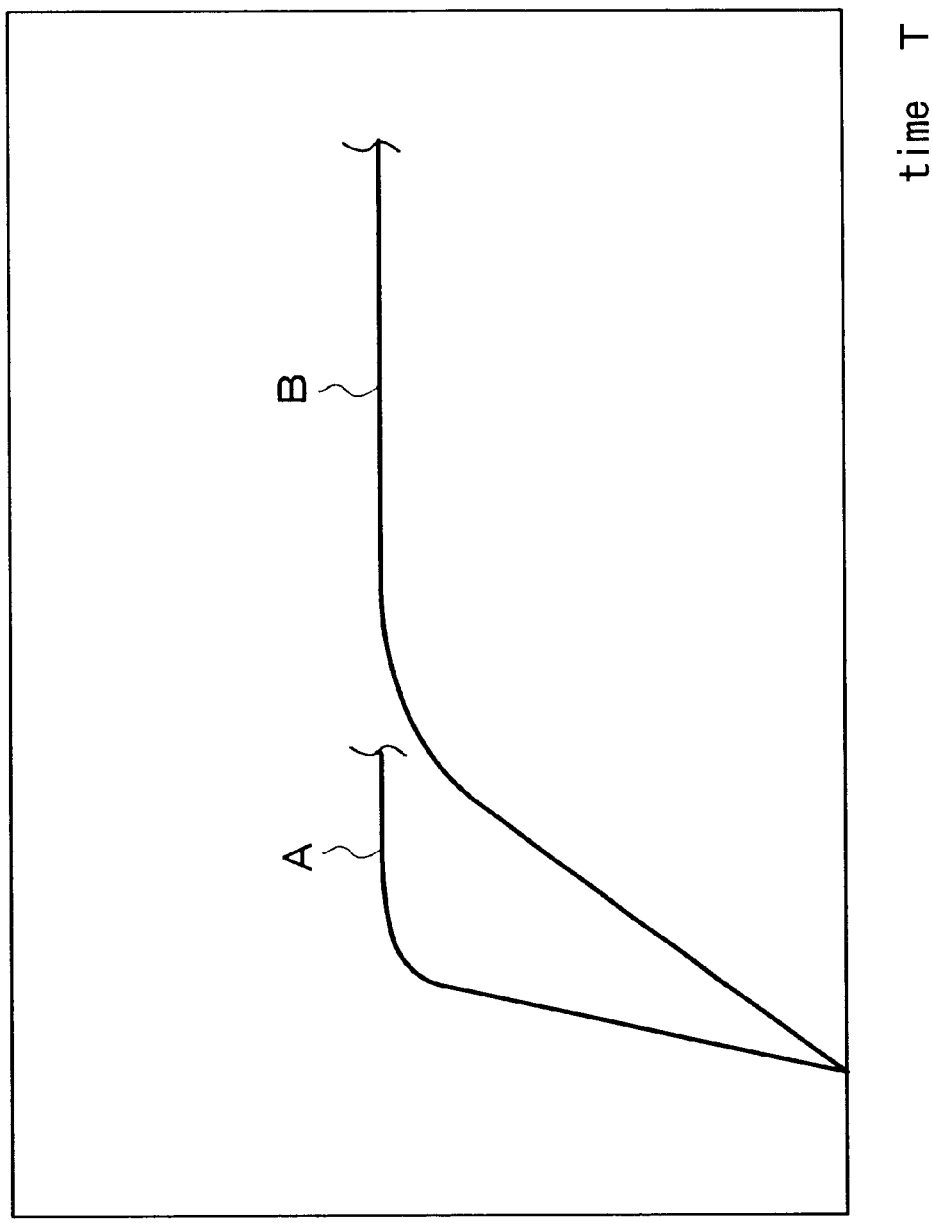
FIG. 27 is a figure representing the result of an experiment in regard to the excited field characteristic.

The improvement in the high-frequency response characteristic is apparent from the experimental result regarding the excited field characteristic of a thin film magnetic head shown in FIG. 27. FIG. 27 shows the experimental result regarding the rise characteristic of an excited field L. In FIG. 27, "horizontal axis" represents time T and "vertical axis" represents the intensity of the excited field L, respectively. The curve "A" represents a characteristic of a thin film magnetic head (see FIG. 24) according to the embodiment that has a thin film coil 9 having a balanced winding structure, and the curve "B" represents the characteristic of a thin film magnetic head (see FIG. 26) as a comparison that has a thin film coil having a spiral structure, respectively. The quantities of the magnetic flux generated in the thin film magnetic head in both "A" and "B" are identical. As shown in FIG. 27, the rise gradient of the excited field L of the thin film magnetic head "A" according to the embodiment is sharper and requires shorter time to be stabilized than those of the thin film magnetic head "B" as a comparison.

Figure 28:
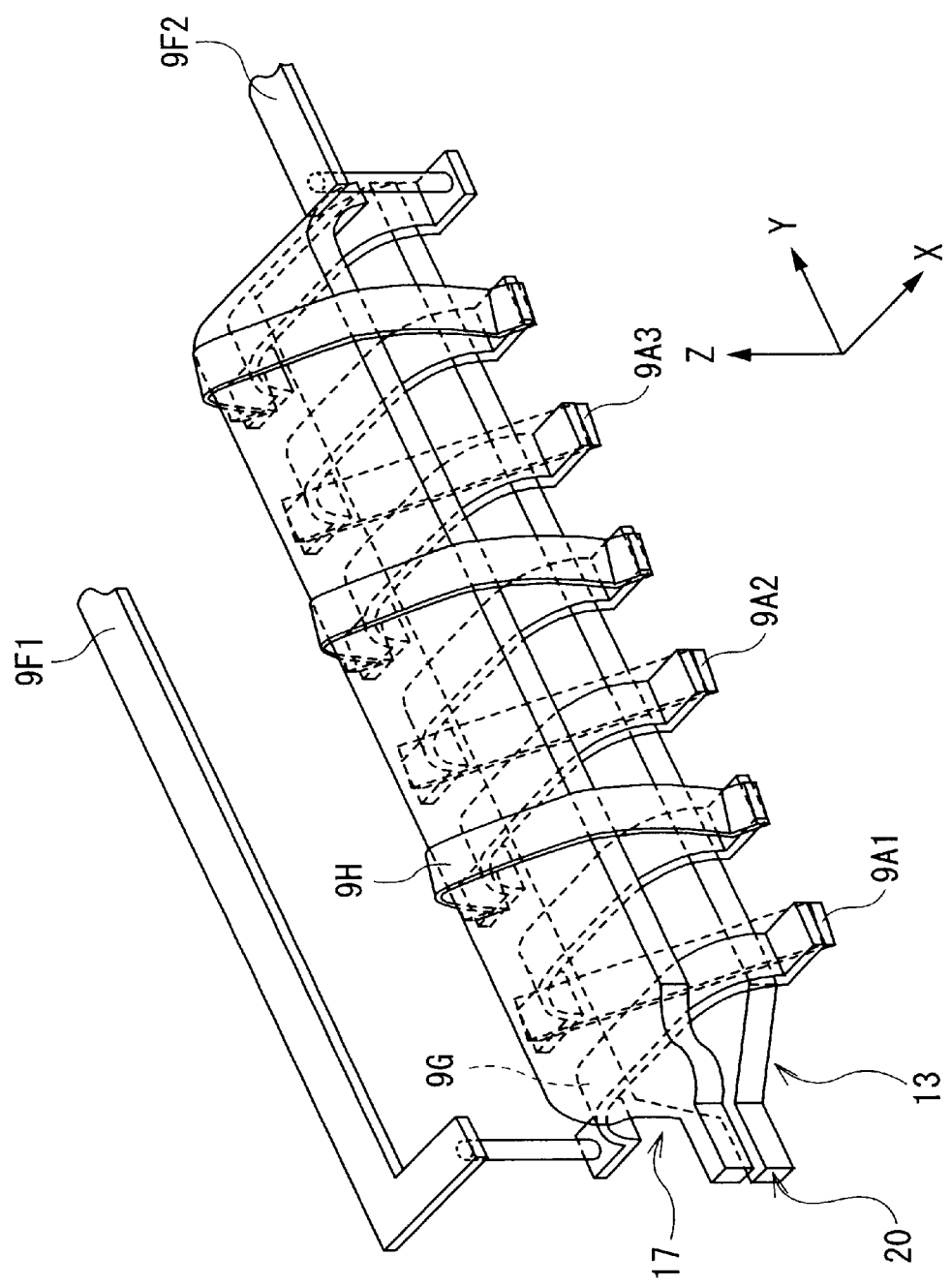
FIG. 28 is a perspective view showing a modification example of the configuration of a thin film magnetic head according to the embodiment.

In the embodiment, the thin film coil 9 is formed as an aggregation of five kinds of the coil parts (9A to 9E). However, it is not necessarily limited to this but the number of the coil parts forming the thin film coil 9 can be changed at will. Specifically, for example, as shown in FIG. 28, the thin film coil 9 may be formed having a configuration including three kinds of the coil parts (9A, 9G, 9H) in which the coil parts 9B and 9C are integrally formed as "9G" and the coil parts 9D and 9E are integrally formed as "9H". Reducing the number of the coil parts decreases the number of manufacturing steps for forming a thin film coil 9. Therefore, the manufacturing time of a thin film magnetic head can be shortened. Other configurations of the thin film magnetic head shown in FIG. 28 are identical to those shown in FIG. 21.

In the embodiment, as shown in FIG. 21 and FIG. 22, the thin film coil 9 is wound around the bottom pole 13 clockwise in the first winding unit U1, and the thin film coil 9 is wound around the top pole 17 counterclockwise in the second winding unit U2. However, it is not necessarily limited to this. The thin film coil 9 may be wound in the inverse direction in the first winding unit U1 and the second winding unit U2. In this case, the same effects as in the above-mentioned embodiment can also be obtained.

Furthermore, in the embodiment, the thin film coil 9 is wound around the bottom pole 13 in the first winding unit U1 and is wound around the top pole 17 in the second winding unit U2. However, it is not necessarily limited to this. The thin film coil 9 may be wound around the top pole 17 in the first winding unit U1 and may be wound around the bottom pole 13 in the second winding unit U2.

Moreover, in the embodiment, the thin film coil 9 is wound around the bottom pole 13 once in the first winding unit U1 and is wound around the top pole 17 once in the second winding unit U2. However, the winding number of the thin film coil 9 in each winding unit (U1, U2) can be changed at will. Specifically, for example, the thin film coil 9 may be wound a plurality of times in the first winding unit U1 and the second winding unit U2, or may be wound a different number of times in the first winding unit U1 and the second winding unit U2. However, when changing the winding number of the thin film coil 9, as described, it is desirable that the total winding number in the first winding unit U1 and that of the second winding unit U2 are identical so as to have uniform quantity of magnetic flux generated in the region near the bottom pole 13 and in the region near the top pole 17.

The invention has been described by referring to the embodiment. However, the invention is not limited to the above-mentioned embodiment but various kinds of modifications are possible. For example, in the above-mentioned embodiment, the case where the coil structure (balanced winding structure) of the invention is applied to a thin film coil for a thin film magnetic head, is described. However, it is not limited to this but is applicable to, in addition to a thin film magnetic head, other magnetic heads (for example, video head or the like) having the same configuration (two magnetic substances facing each other and a coil for generating magnetic flux) and operation devices (recording, reproducing) as the thin film magnetic head. In this case, the same effects as the case of the above-mentioned embodiment can also be obtained.

In the embodiment, only the case of the thin film coil 9 having a balanced winding structure is described. However, it is not limited to this. For example, the thin film coil 9 may include a spiral structure or a helical structure in addition to a balanced winding structure. The thin film coil 9 may include all of the balanced winding structure, the spiral structure and the helical structure.

The plane shape of a series of the composing element including the bottom pole 13 and the top pole 17 in the embodiment are not limited to the ones shown in FIG. 15 and FIG. 18. The plane shape of a series of the composing elements can be modified as long as functions of each composing element can be maintained.

Also, the manufacturing method, materials and the like of a series of the composing element of a thin film magnetic head are not necessarily limited to the ones described in the above-mentioned embodiment. The manufacturing method, materials and the like of a series of the composing element can be changed at will as long as the structural character and the material character of each composing element are displayed.

Furthermore, for example, though a composite thin film magnetic head has been described in the above-mentioned embodiment, the invention may be applied to a thin film magnetic head for recording only having an inductive-type magnetoresistive transducer for writing or a thin film magnetic head having an inductive-type magnetoresistive transducer for both recording and reproducing. The invention can also be applied to a thin film magnetic head having a configuration in which a device for writing and a device for reading-out are stacked in the reversed order.

As described, according to the magnetic head of the invention, portion of the coil which requires high forming precision is decreased since the coil is formed to be a continuum in which the first winding unit U1 and the second winding unit U2 are alternatively coupled. Therefore, manufacturing time of the magnetic head can be shortened and yield can be improved while miniaturizing the coil.

According to the magnetic head or the method of manufacturing a thin film magnetic head of one aspect of the invention, portion of the thin film coil which requires high forming precision is decreased since the thin film coil is formed to be a continuum in which the first winding unit U1 and the second winding unit U2 are alternatively coupled. Therefore, manufacturing time of the thin film magnetic head can be shortened and yield can be improved while miniaturizing the thin film coil.

Obviously many modifications and variations of the present invention are possible in the light of the above teachings. It is therefore to be understood that within the scope of the appended claims the invention may be practiced otherwise than as specifically described.

What is claimed is:

1. A magnetic head comprising: two magnetic substances magnetically coupled to each other, which are extendedly formed in a direction away from a recording-medium-facing surface facing a recording medium, including two magnetic poles facing each other with a gap in between facing the recording medium; and a coil extendedly formed along in the extended direction of the two magnetic substances including a first winding unit wound around one of the two magnetic substances in a predetermined direction and a second winding unit wound around the other magnetic substances of the two magnetic substances in the opposite direction of the predetermined direction; and an insulator which isolates the coil from the two magnetic substances, wherein:

the coil is in a form of continuum in which the first winding unit and the second winding unit are alternatively coupled along the extended direction.

2. A magnetic head according to claim 1, wherein at least the gap, the two magnetic substances, the coil and the insulator are formed of a thin film.

3. A method of manufacturing a magnetic head comprising: two magnetic layers magnetically coupled to each other, which are extendedly formed in a direction away from a recording-medium-facing surface facing a recording medium, including two magnetic poles facing each other with a gap layer in between facing the recording medium; and a coil extendedly formed along in the extended direction of the two magnetic layers including a first winding unit wound around one of the two magnetic layers in a predetermined direction and a second winding unit wound around the other magnetic layer of the two magnetic layers in the opposite direction of the predetermined direction; and an insulator which isolates the coil from the two magnetic layers, wherein:

a plurality of elements composing the thin film coil is stacked in order so that the thin film coil is formed to be in a form of continuum in which the first winding unit and the second winding unit are alternatively coupled along the extended direction.

* * * * *